(12) United States Patent
Matsumura et al.

(10) Patent No.: US 11,997,675 B2
(45) Date of Patent: May 28, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 334 days.

(21) Appl. No.: 17/438,731

(22) PCT Filed: Mar. 14, 2019

(86) PCT No.: PCT/JP2019/010635
§ 371 (c)(1),
(2) Date: Sep. 13, 2021

(87) PCT Pub. No.: WO2020/183723
PCT Pub. Date: Sep. 17, 2020

(65) Prior Publication Data
US 2022/0132542 A1    Apr. 28, 2022

(51) Int. Cl.
*H04W 72/1273* (2023.01)
*H04W 72/0446* (2023.01)
*H04W 72/0453* (2023.01)
*H04W 72/23* (2023.01)

(52) U.S. Cl.
CPC ... *H04W 72/1273* (2013.01); *H04W 72/0446* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 11,778,631 B2* | 10/2023 | Kwak | H04L 69/324 370/329 |
| 2018/0035459 A1* | 2/2018 | Islam | H04L 5/0053 |
| 2019/0098612 A1* | 3/2019 | Babaei | H04W 72/0446 |
| 2019/0182870 A1* | 6/2019 | Shih | H04W 16/32 |

(Continued)

FOREIGN PATENT DOCUMENTS

WO    2018/231036 A1    12/2018

OTHER PUBLICATIONS

Office Action issued in the counterpart Chinese Application No. 201980096387.6, dated Jun. 8, 2023 (19 pages).

(Continued)

*Primary Examiner* — Hassan A Phillips
*Assistant Examiner* — Gautam Sharma
(74) *Attorney, Agent, or Firm* — Osha Bergman Watanabe & Burton LLP

(57) ABSTRACT

One aspect of a user terminal according to the present invention includes: a receiving section that receives downlink control information that is common between groups including one or more user terminals from at least one of a plurality of Transmission/Reception Points (TRPs) that transmit downlink shared channels; and a control section that determines a TRP that becomes an application target of the downlink control information. Consequently, it is possible to appropriately perform a UE-group common signalling even when multiple TRPs are used.

6 Claims, 16 Drawing Sheets

(56) References Cited

U.S. PATENT DOCUMENTS

| | | | | |
|---|---|---|---|---|
| 2019/0208366 | A1* | 7/2019 | Sosnin | G01S 13/876 |
| 2019/0306801 | A1* | 10/2019 | Zhou | H04W 52/04 |
| 2019/0306848 | A1* | 10/2019 | Zhou | H04W 72/20 |
| 2019/0313429 | A1* | 10/2019 | Cheng | H04W 76/27 |
| 2019/0349904 | A1* | 11/2019 | Kwak | H04W 72/23 |
| 2020/0015119 | A1* | 1/2020 | Takeda | H04L 1/1864 |
| 2020/0100172 | A1* | 3/2020 | Wang | H04W 24/02 |
| 2020/0119895 | A1* | 4/2020 | Choi | H04L 5/0053 |
| 2020/0145972 | A1* | 5/2020 | Kwak | H04W 72/23 |
| 2020/0205059 | A1* | 6/2020 | Khoshnevisan | H04L 5/0094 |
| 2020/0235874 | A1* | 7/2020 | Yeo | H04W 72/04 |
| 2020/0288463 | A1* | 9/2020 | Lee | H04W 72/0446 |
| 2020/0328866 | A1* | 10/2020 | Du | H04L 5/001 |
| 2020/0344729 | A1* | 10/2020 | Park | H04L 5/0053 |
| 2021/0083914 | A1* | 3/2021 | Cao | H04L 5/0053 |
| 2021/0126753 | A1* | 4/2021 | Mochizuki | H04L 5/0037 |
| 2022/0200771 | A1 | 6/2022 | Choi et al. | |

OTHER PUBLICATIONS

Huawei, HiSilicon:"Offline Discussion for Multi-TRP/Panel Transmission and General plan for RAN1 96bis", 3GPP TSG RAN WG1 Meeting #96, R1-1903610; Athens, Greece, Feb. 25-Mar. 1, 2019 (4 pages).

Office Action issued in the counterpart Japanese Patent Application No. 2021-505470, mailed on Jan. 24, 2023 (6 pages).

International Search Report issued in PCT/JP2019/010635 on May 14, 2019 (2 pages).

Written Opinion of the International Searching Authority issued in PCT/JP2019/010635 on May 14, 2019 (4 pages).

Vivo; "Further Discussion on Multi-TRP Transmission"; 3GPP TSG RAN1 #96, R1-1901702; Athens, Greece; Feb. 25-Mar. 1, 2019 (14 pages).

NTT Docomo, Inc.; "Enhancements on multi-TRP/panel transmission"; 3GPP TSG RAN WG1 #96, R1-1902812; Athens, Greece; Feb. 25-Mar. 1, 2019 (8 pages).

Qualcomm Incorporated; "Multi-TRP Enhancements"; 3GPP TSG-RAN WG1 Meeting #96, R1-1903043; Athens, Greece; Feb. 25-Mar. 1, 2019 (30 pages).

Nokia, Nokia Shanghai Bell; "Enhancements on Multi-TRP/Panel Transmission"; 3GPP TSG RAN WG1 #96 Meeting, R1-1902563; Athens, Greece; Feb. 25-Mar. 1, 2019 (16 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

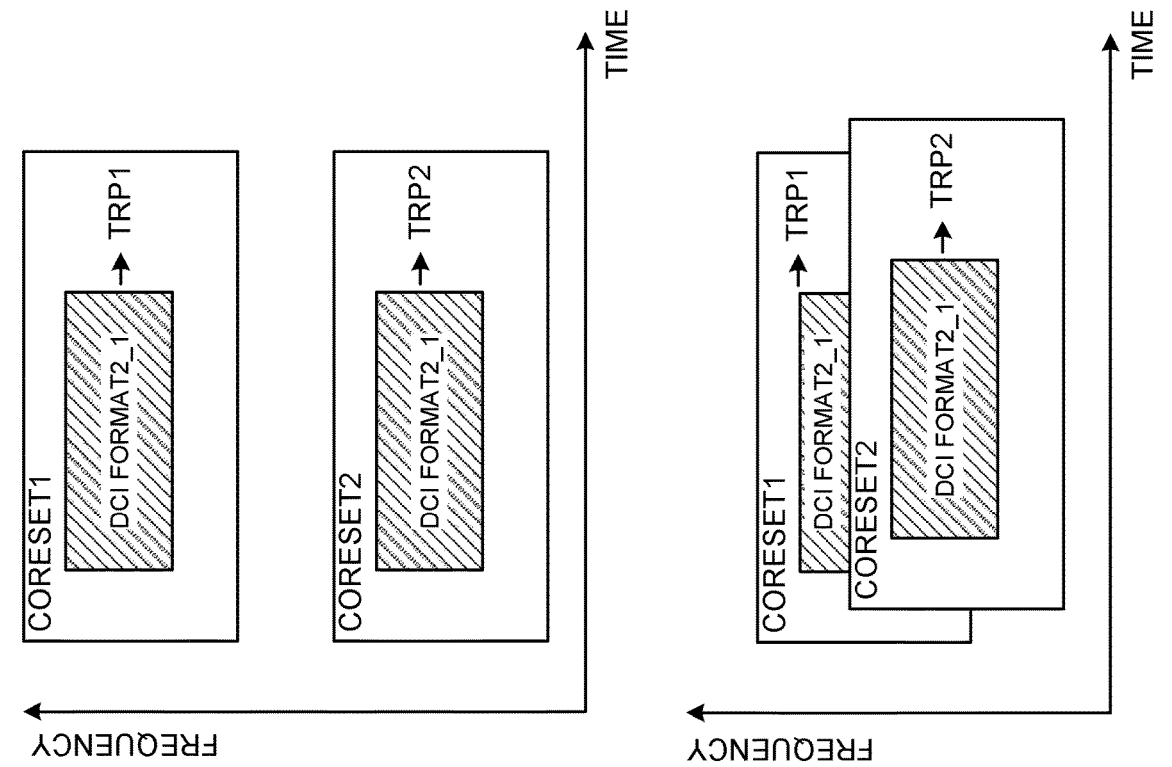
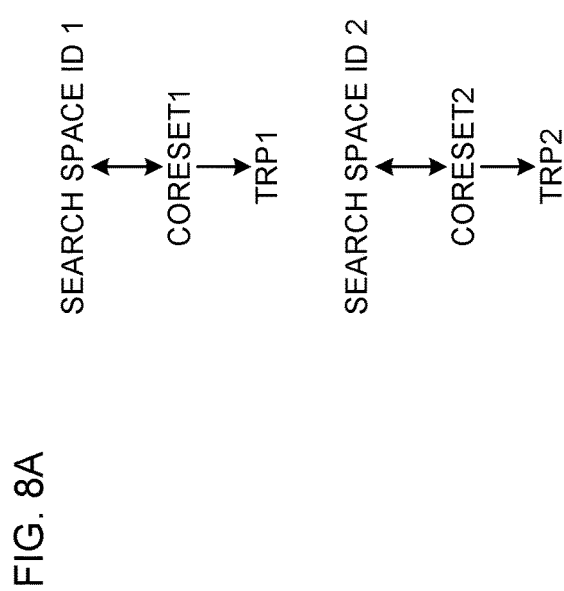
FIG. 8A
FIG. 8B

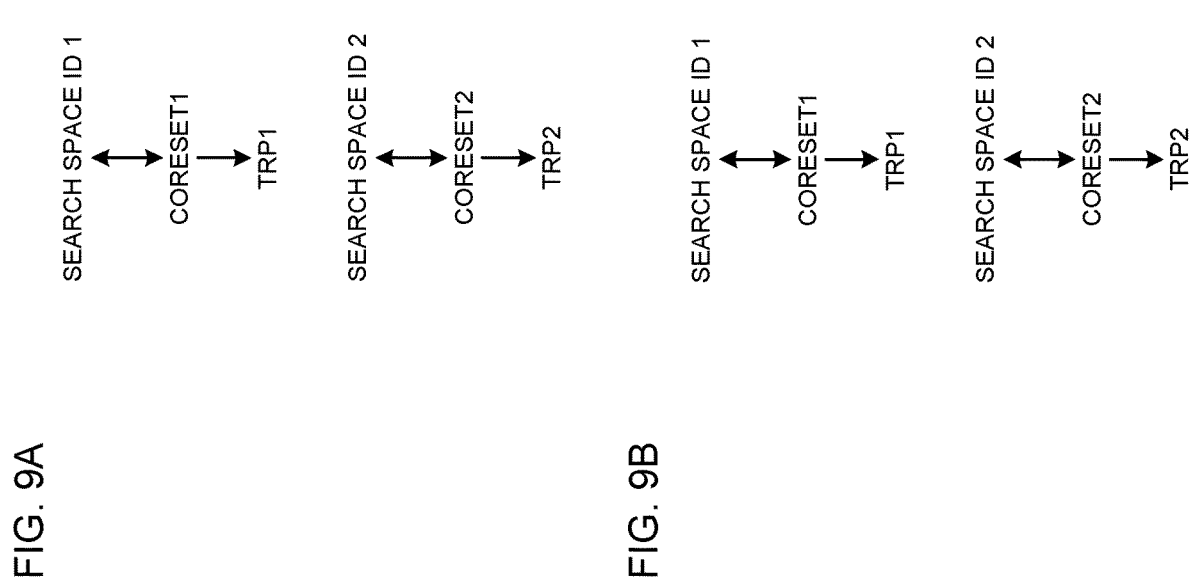

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+(plus), New Radio (NR) or 3GPP Rel. 15 or subsequent releases) are also studied.

In legacy LTE systems (e.g., 3GPP Rel. 8 to 14), a user terminal (User Equipment: UE) controls transmission of a Physical Uplink Shared Channel (e.g., PUSCH) and reception of a Physical Downlink Shared Channel (e.g., PDSCH) based on Downlink Control Information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied for a future radio communication system (e.g., NR) that one or a plurality of Transmission/Reception Points (TRPs)) (multiple TRPs) perform DL transmission for a user terminal (User Equipment (UE)).

However, multiple TRPs are not taken into account for previous NR specifications. Hence, when the multiple TRPs are used, there is a risk that it is not possible to appropriately control a common signalling (UE-group common signalling) for a group (UE group) including one or more UEs.

It is therefore one of objects of the present disclosure to provide a user terminal and a radio communication method that can appropriately perform a UE-group common signalling even when multiple TRPs are used.

Solution to Problem

One aspect of a user terminal according the present invention includes: a receiving section that receives downlink control information that is common between groups including one or more user terminals from at least one of a plurality of Transmission/Reception Points (TRPs) that transmit downlink shared channels; and a control section that determines a TRP that becomes an application target of the downlink control information.

Advantageous Effects of Invention

According to the present invention, it is possible to appropriately perform a UE-group common signalling even when multiple TRPs are used.

BRIEF DESCRIPTION OF DRAWINGS

FIGS. 8A and 8B are diagrams illustrating TRP determination examples based on CORESETs according to the second aspect.

FIGS. 9A and 9B are diagrams illustrating TRP determination examples based on sequence IDs according to the second aspect.

DESCRIPTION OF EMBODIMENTS (UE-Group Common Signalling)

Figure 1A:
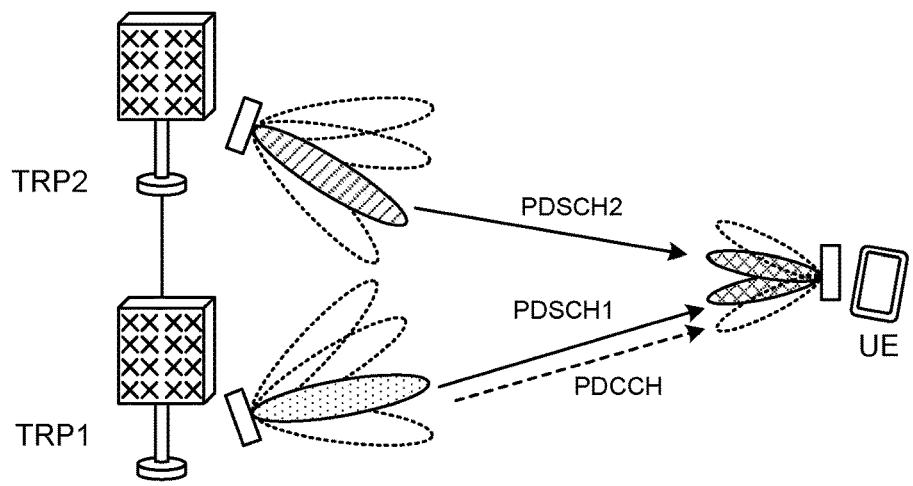
FIGS. 1A to 1C are diagrams illustrating one example of multiple TRP scenarios.

According to NR, a signalling (also referred to as, for example, a UE-group common signalling, a group common signalling or a common signalling) that is common between groups (UE groups) including one or more user terminals (User Equipments (UEs)) is performed. For example, the UE-group common signalling may be used for, for example, at least one of following (1) to (4).

(1) A slog configuration indication
(2) An interrupted transmission indication (also referred to as, for example, a pre-emption indication)

(3) A Transmission Power Control (TPC) command (group TPC command) for a Physical Uplink Control Channel (PUCCH) or a Physical Uplink Shared Channel (PUSCH)

(4) Switching of a Sounding Reference Signal (SRS)

(1) Slot Configuration Indication

For example, a slot configuration may be indicated to one or a plurality of UEs by at least one of a higher layer parameter and Downlink Control Information (DCI). The higher layer parameter may be at least one of, for example, "TDD-UL-DL-ConfigurationCommon" and "TDD-UL-DL-ConfigDedicated" of a Radio Resource Control (RRC) Information Element (IE) (referred to as an RRC IE below).

The DCI may include one or a plurality of slot format indicators, and be referred to as, for example, a DCI format 2_0 (format 2_0). The DCI format 2_0 may include or be added with a Cyclic Redundancy Check (CRC) bit scrambled by a Slot Format Indication Radio Network Temporary Identifier (SFI-RNTI). That is, the DCI format 2_0 may be CRC-scrambled by the SFI-RNTI.

A UE may monitor one or more sets of search spaces (search space sets) (e.g., Type 3-PDCCH Common Search Space set (Type 3-PDCCH CSS set)), and detect the DCI format 2_0 CRC-scrambled by the SFI-RNTI.

(2) Interruption Transmission Indication

Based on at least one of a higher layer parameter (e.g., DownlinkPreemption of the RRC IE) and DCI, the UE may determine frequency domain resources in which it may be assumed that transmission to one or a plurality of UEs is not performed (e.g., entirety or half of a bandwidth part or one or more Physical Resource Blocks (PRBs) (also referred to as, for example, Resource Blocks (RBs))), and time domain resources (e.g., one or more symbols).

The DCI may include one or a plurality of pre-emption indications, and be referred to as, for example, a DCI format 2_1 (format 2_1). The DCI format 2_1 may be CRC-scrambled by an Interruption RNTI (INT-RNTI). The UE may monitor a search space set (e.g., Type 3-PDCCH CSS set), and detect the DCI format 2_1 CRC-scrambled by the INT-RNTI.

The INT-RNTI may be given to one or a plurality of UEs by a higher layer parameter (e.g., "int-RNTI" in "DownlinkPreemption" of the RRC IE). A size of the DCI format 2_1 may be given to the UE by a higher layer parameter (e.g., "dci-PayloadSize" in "DownlinkPreemption" of the RRC IE), and may be, for example, 126 bits at maximum.

Each pre-emption indication in the DCI format 2_1 may include a given number of bits (e.g., 14 bits). At which position in the DCI format 2_1 a pre-emption indication of a given serving cell is started may be given by a higher layer parameter (e.g., "servingCellId" and "positionInDCI" in "INT-ConfigurationPerServingCell" in "DownlinkPreemption" of the RRC IE).

(3) Group TPC Command

The UE may control transmission power of a PUCCH or a PUSCH based on a TPC command in DCI. The DCI may include one or a plurality of TPC commands, and be referred to as, for example, a DCI format 2_2 (format 2_2). The DCI format 2_2 including the TPC command for the PUSCH may be CRC-scrambled by a TPC-PUSCH-RNTI. The DCI format 2_2 including the TPC command for the PUCCH may be CRC-scrambled by a TPC-PUCCH-RNTI.

The UE may monitor a search space set (e.g., Type 3-PDCCH CSS set), and detect the DCI format 2_2 CRC-scrambled by a TPC-PUCCH-RNTI or a TPC-PUSCH-RNTI.

(4) SRS Switching

The UE may control SRS transmission power based on at least one of a higher layer parameter (e.g., "SRS-Carrier-Switching" of the RRC IE) and DCI. The DCI may include one or a plurality of TPC commands, and be referred to as, for example, a DCI format 2_3 (format 2_3). The DCI format 2_3 may be CRC-scrambled by a TPC-SRS-RNTI.

The UE may monitor a search space set (e.g., Type 3-PDCCH CSS set), and detect the DCI format 2_3 CRC-scrambled by a TPC-PUCCH-RNTI or a TPC-PUSCH-RNTI.

The above DCI format 2_x (x=0, 1, 2 or 3) is used for a UE-group common signalling, and therefore is also referred to as, for example, UE-group common DCI, common DCI or group common DCI. The UE may monitor a set of given search spaces (e.g., common search spaces), and detect the DCI format 2_x.

(Multiple TRPs)

It is studied for NR that one or a plurality of Transmission/Reception Points (TRPs) (multiple TRPs) perform DL transmission (e.g., PDSCH transmission) for the UE by using one or a plurality of panels (multiple panels). In addition, in this description, the Transmission/Reception Point (TRP) may be read as a transmission point, a reception point, a panel, a cell, a serving cell, a carrier or a Component Carrier (CC).

Figure 1B:
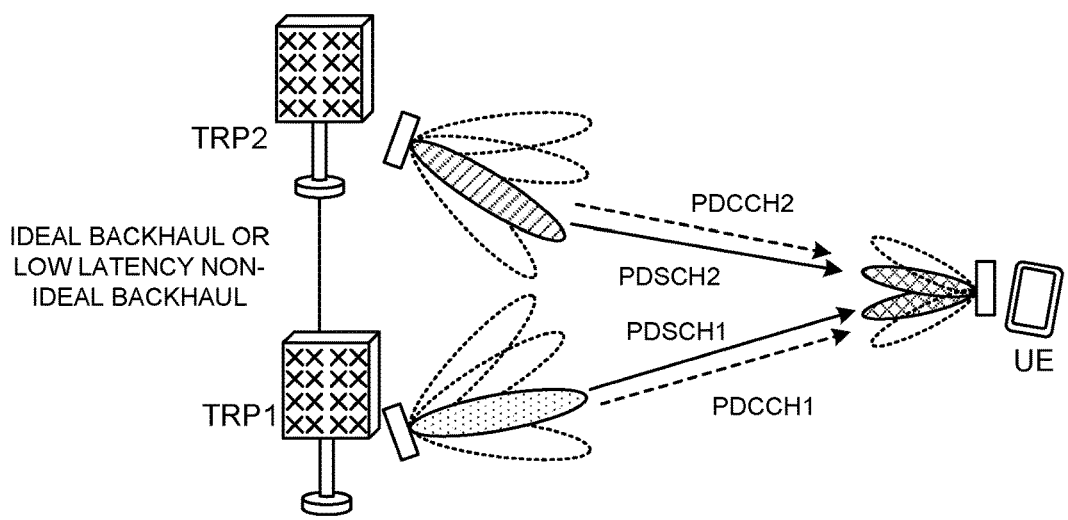
Figure 1C:
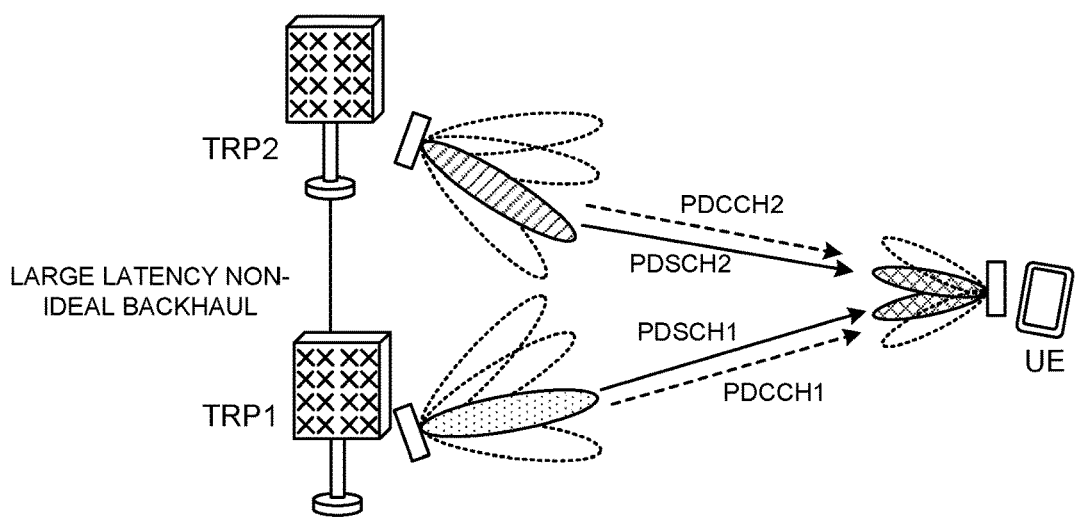

FIGS. 1A to 1C are diagrams illustrating one example of multiple TRP scenarios. FIGS. 1A to 1C assume that each TRP can transmit four different beams. However, the present embodiment is not limited to this. In this regard, FIGS. 1A to 1C assume that each TRP includes one panel. However, one TRP may include a plurality of panels, and reception of a PDSCH from each of a plurality of these panels may be controlled by a PDCCH from a single panel or a plurality of panels.

FIG. 1A illustrates one example of a case where only one TRP (a TRP 1 in this example) of multiple TRPs transmits a control signal (e.g., Physical Downlink Control Channel (PDCCH)) to the UE, and the multiple TRPs transmit data signals (e.g., Physical Downlink Shared Channels (PDSCHs)).

For example, in FIG. 1A, the UE receives PDSCHs 1 and 2 respectively transmitted from TRPs 1 and 2 based on one PDCCH (DCI) from the TRP 1. Thus, scheduling of PDSCHs from a plurality of TRPs that use a PDCCH (DCI) from a single TRP may be referred to as, for example, single DCI, a single PDCCH, a single master mode, a PDCCH type A (first PDCCH type), or a DMRS port group type A (first DMRS port group type).

FIG. 1B illustrates one example of a case where the respective multiple TRPs transmit different control signals (e.g., PDCCHs) to the UE, and the respective multiple TRPs transmit data signals (e.g., PDSCHs).

For example, in FIGS. 1B and 1C, the UE receives the PDSCHs 1 and 2 respectively transmitted from the TRPs 1 and 2 based on PDCCHs (pieces of DCI) 1 and 2 respectively transmitted from the TRPs 1 and 2. Thus, scheduling of PDSCHs from a plurality of TRPs that use PDCCHs (pieces of DCI) from a plurality of TRPs may be also referred to as, for example, multiple pieces of DCI, multiple PDCCHs or a multiple master mode.

In a case of the multiple PDCCHs, as illustrated in FIG. 1B, a plurality of these TRPs (e.g., TRPs 1 and 2) may be connected by an ideal backhaul, or may be connected by a low latency non-ideal backhaul. The scenario illustrated in FIG. 1B may be referred to as, for example, a PDCCH type B (second PDCCH type) or a DMRS port group type B (second DMRS port group type).

Alternatively, in the case of the multiple PDCCHs, as illustrated in FIG. 1C, a plurality of these TRPs (e.g., TRPs 1 and 2) may be connected by a large latency non-ideal backhaul. The scenario illustrated in FIG. 1B is also referred to as, for example, a PDCCH type C (third PDCCH type) or a DMRS port group type C (second DMRS port group type).

It is studied for the above multiple TRP scenarios that a plurality of TRPs respectively transmit non-coherent transmission DL signals (e.g., PDSCHs). Transmitting the non-coherent transmission DL signals (or DL channels) from a plurality of TRPs in a joint manner is also referred to as Non-Coherent Joint Transmission (NCJT).

For example, a plurality of these TRPs may transmit PDSCHs associated with an identical Codeword (CW) by using different layers. For example, the TRP 1 may transmit the PDSCH 1 associated with a CW 1 by using a given number of layers (e.g., layers 1 and 2), and the TRP 2 may transmit the PDSCH 2 associated with the CW 1 by using a given number of layers (e.g., layers 3 and 4).

Alternatively, a plurality of these TRPs may transmit PDSCHs associated with different CWs. For example, the TRP 1 may transmit the PDSCH 1 associated with the CW 1, and the TRP 2 may transmit the PDSCH 2 associated with a CW 2. In addition, the CW may be read as a Transport Block (TB).

It may be assumed that a plurality of PDSCHs to be subjected to NCJT do not have a Quasi-Co-Location (QCL) relation (are not quasi-co-located). Furthermore, it may be defined that a plurality of PDSCHs subjected to NCJT may partially or completely overlap in at least one of time and frequency domains.

According to the above multiple TRP scenarios, how to control the UE-group common signalling matters.

In a case of, for example, a single PDCCH illustrated in FIG. 1A, when the TRPs 1 and 2 that transmit the PDSCHs have different cell IDs (inter-cell TRPs), the UE can determine which pre-emption indication of a PDSCH transmitted from which TRP the DCI format 2_1 transmitted from the TRP 1 or the TRP 2 is, based on a cell ID associated with the pre-emption indication.

On the other hand, when the TRPs 1 and 2 have same cell IDs (intra-cell TRPs) in FIG. 1A, there is a risk that the UE cannot appropriately determine which pre-emption indication of a PDSCH transmitted from which TRP the DCI format 2_1 transmitted from the TRP 1 or the TRP 2 is.

Similarly, in a case of the multiple PDCCHs illustrated in FIG. 1B or 1C, when the TRPs 1 and 2 have different cell IDs (inter-cell TRPs), the UE can determine which pre-emption indication of a PDSCH transmitted from which TRP the DCI format 2_1 transmitted from the TRP 1 and the TRP 2 is, based on a cell ID associated with the pre-emption indication.

On the other hand, in FIGS. 1B and 1C, too, when the TRPs 1 and 2 have same cell IDs (intra-cell TRPs), there is a risk that the UE cannot appropriately determine which pre-emption indication of a PDSCH transmitted from which TRP the DCI format 2_1 transmitted from the TRP 1 and the TRP 2 is.

Thus, when a plurality of TRPs that transmit PDSCHs to the UE have the same cell IDs, there is a risk that the UE cannot appropriately determine which TRP among a plurality of these TRPs the DCI format 2_1 transmitted from at least one of a plurality of these TRPs is a target. A similar problem may occur not only in a case of the DCI format 2_1, but also in a case of UE-group common DCI such as the DCI formats 2_0, 2_2 and 2_3.

Hence, the inventors of the present disclosure have studied a method for appropriately controlling a UE-group common signalling even when a plurality of TRPs that transmit PDSCHs to the UE have same cell IDs, and reached the present invention. More specifically, the inventors of the present disclosure have conceived appropriately determining a TRP that becomes a target of UE-group common DCI when one of a plurality of these TRPs transmits the UE-group common DCI (first aspect) or when each of a plurality of these TRPs transmits UE-group common DCI (second aspect).

An embodiment according to the present disclosure will be descried in detail below with reference to the drawings. In addition, each aspect of the present embodiment may be each applied alone or may be applied in combination.

In addition, in the present embodiment, a TRP, a panel, an Uplink (UL) transmission entity, an antenna port (DMRS port) of a DeModulation Reference Signal (DMRS), a DMRS port group (DMRS ports), a DMRS port group (CDM group) subjected to Code Division Multiplexing (CDM), a Control Resource Set (CORESET), a search space set, a PDSCH, a codeword and a base station may be interchangeably read.

Furthermore, a panel Identifier (ID) and a panel may be interchangeably read. A TRP ID and a TRP may be interchangeably read. Furthermore, a cell ID and a cell (serving cell) may be interchangeably read. Furthermore, an ID, an index and a number may be interchangeably read.

In addition, in the present embodiment, a cell ID may be interchangeably paraphrased as, for example, a serving cell ID, a serving cell index, a carrier index, a CC index or a carrier indicator.

Furthermore, the present embodiment is applicable in a case of a communication system that uses a plurality of TRPs. The present embodiment may be applied to, for example, a configuration (NCJT) where a plurality of TRPs transmit non-coherent transmission DL signals (e.g., CWs or TBs) in a joint manner, and a configuration where a plurality of TRPs repeatedly transmit one DL signal (e.g., a CW or a TB). According to repeated transmission, one CW or TB may be repeatedly transmitted in at least one of a time domain, a frequency domain and a spatial domain.

Furthermore, the following description assumes that a plurality of these TRPs have same cell IDs. However, the present embodiment is not limited to this, and is also applicable to a case, too, where a plurality of these TRPs have different cell IDs.

(First Aspect)

In the first aspect, one of a plurality of TRPs that transmit PDSCHs to a UE transmits UE-group common DCI. One example of the UE-group common DCI is exemplified as a DCI format 2_1 below, yet is applicable to another DCI format 2_x (x=0, 2 or 3), too.

In the first aspect, a plurality of PDSCHs respectively transmitted from a plurality of these TRPs may be scheduled by a single DL assignment transmitted from a single TRP (e.g., a single PDCCH in FIG. 1A), or may be scheduled by a plurality of DL assignments respectively transmitted from a plurality of these TRPs (e.g., multiple PDCCHs in FIG. 1B).

The DL assignment is the DCI or the PDCCH used for scheduling of the PDSCH. The DL assignment may be, for example, a DCI format 1_0 or 1_1. Furthermore, the DL assignment may be UE-specific DCI. The UE may monitor a given search space (e.g., UE-specific search space) set, and detect the DL assignment.

Figure 2A:
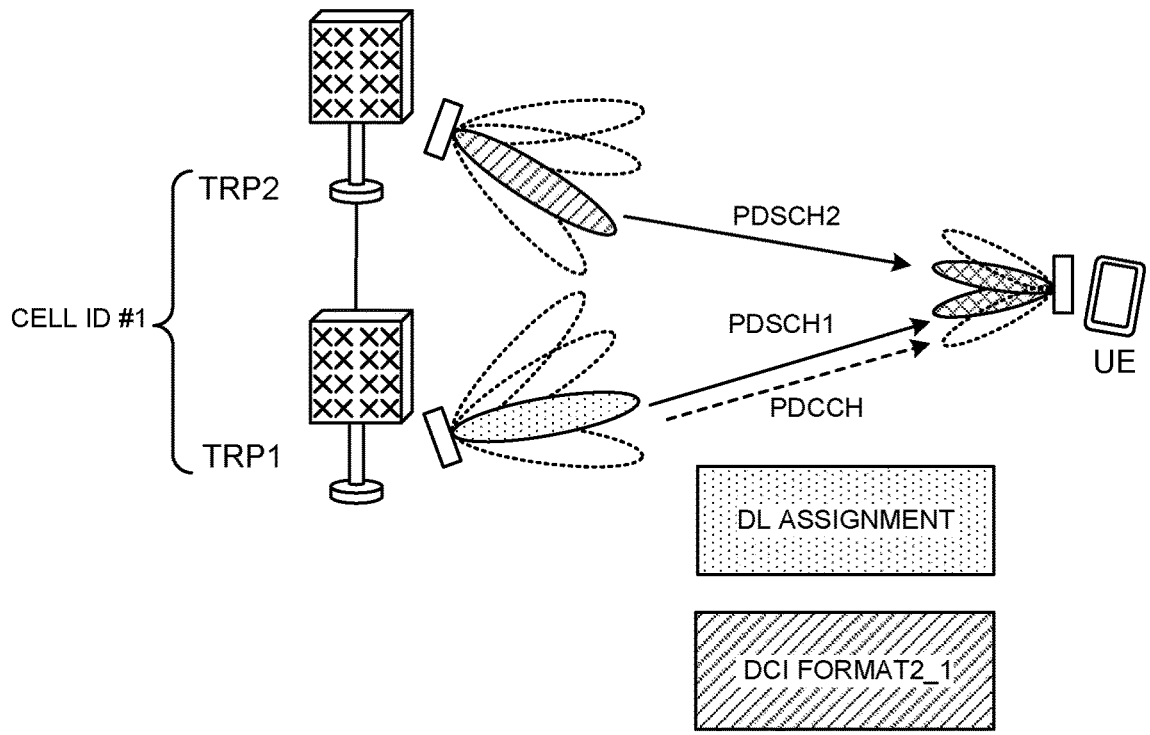
FIGS. 2A and 2B are diagrams illustrating one example of transmission of a DCI format 2_1 according to a first aspect.
Figure 2B:
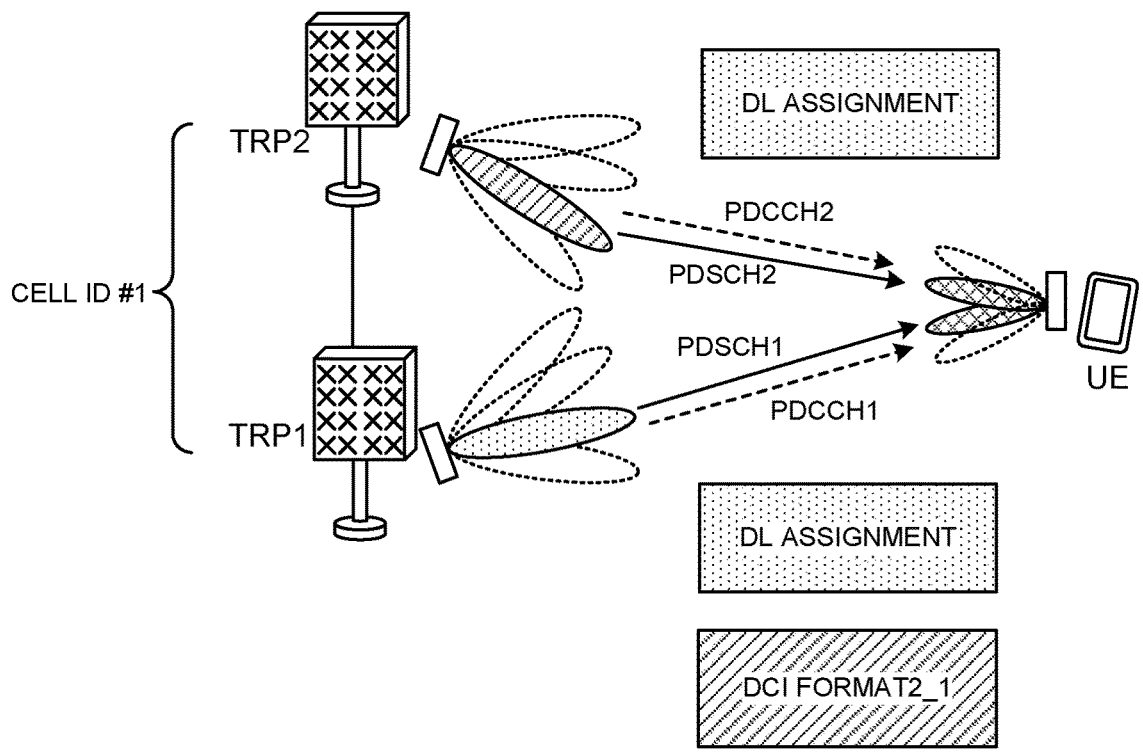

FIGS. 2A and 2B are diagrams illustrating one example of transmission of the DCI format 2_1 according to the first aspect. FIG. 2A illustrates one example of a single PDCCH, and FIG. 2B illustrates one example of multiple PDCCHs. In addition, in FIGS. 2A and 2B, the number of TRPs that transmit PDSCHs to the UE is 2, yet may be 2 or more. Furthermore, FIGS. 2A and 2B assume that TRPs 1 and 2 have same cell IDs #1 in one example.

For example, in FIG. 2A, PDSCHs 1 and 2 respectively transmitted from the TRPs 1 and 2 are scheduled by a DL assignment transmitted from the TRP 1 via a PDCCH. In FIG. 2A, the DCI format 2_1 may be transmitted via the PDCCH from the TRP 1.

On the other hand, in FIG. 2B, the PDSCH 1 transmitted from the TRP 1 is scheduled by a DL assignment transmitted from the TRP 1 via a PDCCH 1, and the PDSCH 2 transmitted from the TRP 2 is scheduled by a DL assignment transmitted from the TRP 2 via a PDCCH 2.

In FIG. 2B, the DCI format 2_1 may be transmitted from one of the TRPs 1 and 2. Furthermore, a higher layer signalling (higher layer parameter) (e.g., RRC signalling (RRC IE)) associated with the DCI format 2_1 may be also transmitted from one of the TRPs 1 and 2.

Even when PDSCHs from a plurality of TRPs are scheduled by PDCCHs from a plurality of these respective TRPs are scheduled as illustrated in FIG. 2B, the DCI format 2_1 may be transmitted from one of a plurality of these TRPs. In this case, a plurality of these TRPs may be connected by an ideal backhaul or a low latency non-ideal backhaul to recognize scheduling of the respective TRPs.

In FIGS. 2A and 2B, the UE may monitor a given search space set (e.g., Type 3-PDCCH CSS set), and detect the DCI format 2_1 CRC-scrambled by a given RNTI (e.g., INT-RNTI).

The given search space set may be configured to the UE for at least one of a specific serving cell, a specific Bandwidth Part (BWP) and a specific TRP. A periodicity of the given search space set and at least one of time domain resources and frequency domain resources may be configured by a higher layer parameter.

When detecting the DCI format 2_1 transmitted from one of a plurality of TRPs that transmit PDSCHs, the UE may determine at least one TRP that becomes an application target of the DCI format 2_1. For example, the UE may apply the DCI format 2_1 to a plurality of these TRPs (first application example), or apply the DCI format 2_1 to one of a plurality of these TRPs (second application example).

First Application Example

In the first application example, when detecting the DCI format 2_1 transmitted from one of a plurality of TRPs that transmit PDSCHs (e.g., FIGS. 2A and 2B), the UE may apply the DCI format 2_1 to a plurality of these TRPs.

Figure 3:
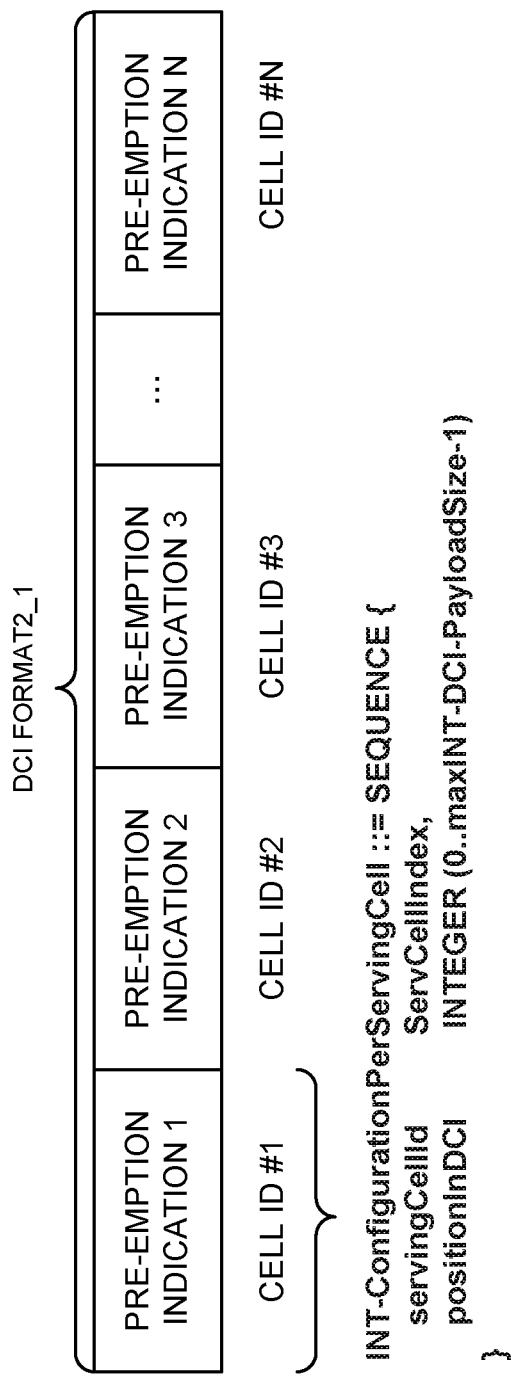
FIG. 3 is a diagram illustrating a first application example of the DCI format 2_1 according to the first aspect.

FIG. 3 is a diagram illustrating the first application example of the DCI format 2_1 according to the first aspect. As illustrated in FIG. 3, the DCI format 2_1 may include N (N≥1) pre-emption indications. Each pre-emption indication may be associated with a cell ID.

The UE receives information related to pre-emption (pre-emption information such as "DownlinkPreemption" of the RRC IE). The pre-emption information may include configuration information related to the pre-emption indication (e.g., "INT-ConfigurationPerServingCell" of the RRC IE) per serving cell.

The configuration information may include a cell ID (e.g., "servingCellId" of the RRC IE), and information (position information such as "positionInDCI" of the RRC IE) indicating a position of the pre-emption indication associated with the cell ID in the DCI format 2_1.

In addition, a hierarchical structure of the position information of the pre-emption indication associated with each serving cell is not limited to the above. The UE may receive information that makes it possible to identify the serving cell associated with each pre-emption indication in the DCI format 2_1.

The UE may determine a cell (serving cell) that becomes a target of each pre-emption indication in the DCI format 2_1 based on the above configuration information. For example, in FIG. 3, pre-emption indications 1, 2 and 3 to N in the DCI format 2_1 are associated with cell IDs #1, #2 and #3 to #N, respectively.

In FIG. 3, each pre-emption indication may be associated with one or a plurality of TRPs associated with an same cell ID. When, for example, the TRPs 1 and 2 have the same cell IDs #1 as illustrated in FIGS. 2A and 2B, a pre-emption indication 1 associated with the cell ID #1 may be associated with both of the TRPs 1 and 2 in the DCI format 2_1.

When, for example, detecting the DCI format 2_1 (e.g., FIG. 3) transmitted from the single TRP 1 in FIGS. 2A and 2B, the UE may decode the pre-emption indication 1 associated with the cell ID #1 in the DCI format 2_1. The UE may assume that the decoded pre-emption indication 1 is applied to both of the TRPs 1 and 2 associated with the cell ID #1.

More specifically, the UE may determine at least one of time domain resources (e.g., symbols) and frequency domain resources (e.g., an entire BWP or half of the BWP) in which DL transmission (e.g., PDSCH transmission) from both of the TRPs 1 and 2 is interrupted, based on the pre-emption indication 1.

In the first application example, each pre-emption indication in the DCI format 2_1 is applied to all TRPs having cell IDs associated with the above configuration information. Consequently, by reusing the DCI format 2_1 and the above configuration information according to Rel. 15 (e.g., "INT-ConfigurationPerServingCell" of the RRC IE according to Rel. 15), it is possible to appropriately control pre-emption of DL transmission from a plurality of TRPs having same cell IDs.

Second Application Example

In the second application example, when detecting the DCI format 2_1 transmitted from one of a plurality of TRPs that transmit PDSCHs (e.g., FIGS. 2A and 2B), the UE may apply the DCI format 2_1 to one of a plurality of these TRPs.

The UE may determine a single TRP to which the DCI format 2_1 is applied, based on at least one of a higher layer parameter and DCI (first to third TRP determination examples). The single TRP may be explicitly indicated, or may be implicitly indicated.

First TRP Determination Example

In the first TRP determination example, a TRP to which each pre-emption indication in the DCI format 2_1 is applied may be explicitly indicated in the above pre-emption information (e.g., "DownlinkPreemption" of the RRC IE).

Figure 4:
FIG. 4 is a diagram illustrating a first TRP determination example of a second application example of the DCI format 2_1 according to the first aspect.

FIG. 4 is a diagram illustrating the first TRP determination example of the second application example of the DCI format 2_1 according to the first aspect. Differences from FIG. 3 will be mainly described with reference to FIG. 4.

As illustrated in FIG. 4, each pre-emption indication in the DCI format 2_1 may be associated with a cell ID and a TRP Identifier (TRP ID). The TRP ID may be read as, for example, a panel identifier, a DMRS port identifier, a DMRS port group identifier, a CDM group identifier, a CORESET Identifier (CORESET ID), or a search space identifier (search space ID). Furthermore, the identifier may be read as, for example, an ID, an index or a number.

More specifically, the above pre-emption information (e.g., "DownlinkPreemption" of the RRC IE) may include configuration information related to a pre-emption indication (e.g., "INT-ConfigurationPerServingCell" of the RRC IE) per pre-emption indication in the DCI format 2_1 (or per serving cell and per TRP).

The configuration information may include a cell ID (e.g., "servingCellId" of the RRC IE), a TRP ID (that is, for example, "trpID" of the RRC IE, yet the name of the RRC IE is not limited to this), the cell ID in the DCI format 2_1, and position information of the pre-emption indication associated with the TRP ID (e.g., "positionInDCI" of the RRC IE).

When detecting the DCI format 2_1 transmitted from one of a plurality of TRPs having the same cell IDs, the UE may determine a cell (serving cell) and a TRP that become targets of each pre-emption indication in the DCI format 2_1, based on the above configuration information. Furthermore, the UE may assume that each pre-emption indication is applied to the TRP associated with each pre-emption indication based on the above configuration information.

In addition, the hierarchical structure of the position information of the pre-emption indication associated with each TRP is not limited to the above. The UE only needs to receive information that makes it possible to identify the TRP associated with each pre-emption indication in the DCI format 2_1.

For example, in FIG. 4, the pre-emption indication 1 in the DCI format 2_1 is associated with the cell ID #1 and a TRP ID #1, and a pre-emption indication 2 is associated with the cell ID #1 and a TRP ID #2.

When the TRPs 1 and 2 have the same cell IDs #1 as illustrated in FIGS. 2A and 2B, the UE may assume that the pre-emption indication 1 associated with the cell ID #1 and the TRP ID #1 may be applied to DL transmission from the TRP 1. On the other hand, the UE may assume that the pre-emption indication 2 associated with the cell ID #1 and the TRP ID #2 is applied to DL transmission from the TRP 2.

In the first TRP determination example, the configuration information related to the pre-emption indication (e.g., "INT-ConfigurationPerServingCell" of the RRC IE) includes not only the cell ID but also the TRP ID, so that, even when a plurality of TRPs have same cell IDs, the UE can appropriately determine a TRP to which each pre-emption indication in the DCI format 2_1 is applied.

Second TRP Determination Example

In the second TRP determination example, a TRP to which each pre-emption indication in the DCI format 2_1 is applied may be explicitly indicated.

Figure 5:
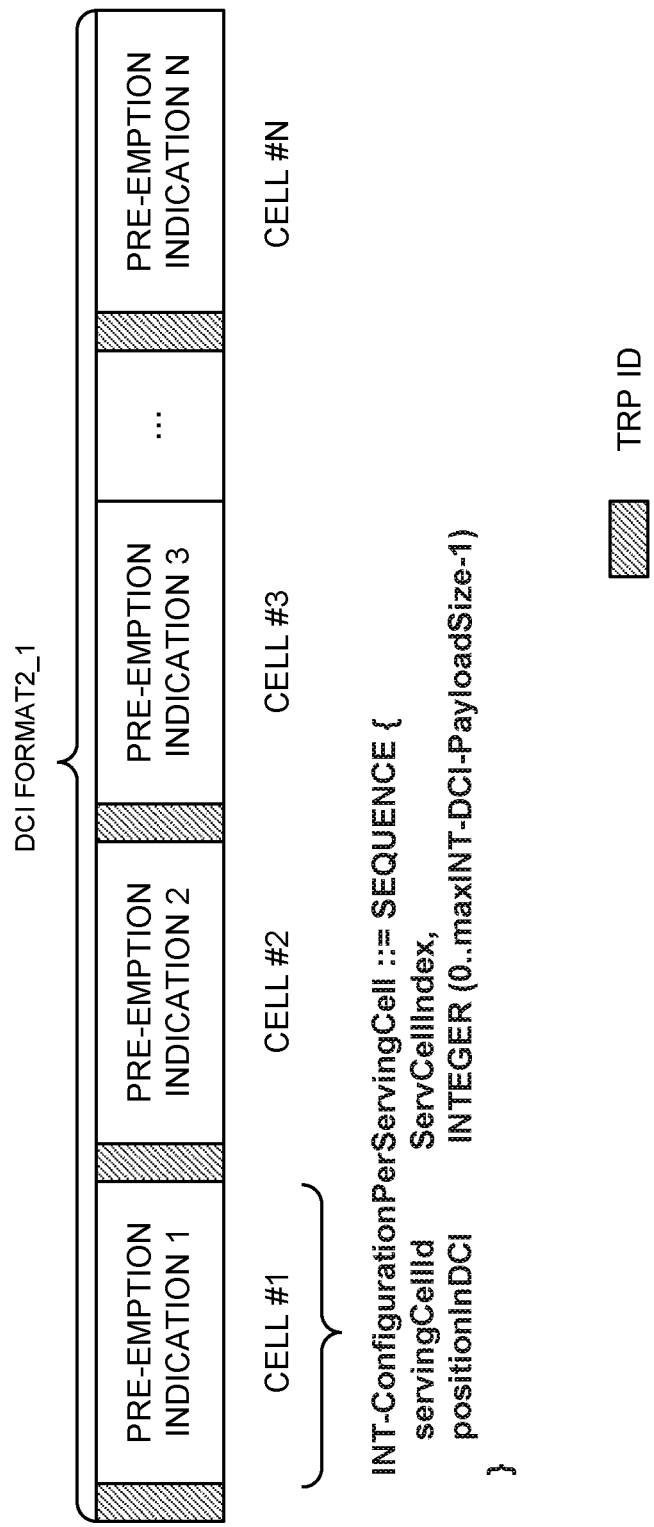
FIG. 5 is a diagram illustrating a second TRP determination example of the second application example of the DCI format 2_1 according to the first aspect.

FIG. 5 is a diagram illustrating the second TRP determination example of the second application example of the DCI format 2_1 according to the first aspect. Differences from FIG. 3 or 4 will be mainly described with reference to FIG. 5. As illustrated in FIG. 5, the DCI format 2_1 may include a given field that indicates N (N≥1) pre-emption indications and N TRPs (or TRP IDs).

Similar to FIG. 3, in FIG. 5, each pre-emption indication may be associated with a cell ID based on configuration information related to the pre-emption indication per serving cell (e.g., "INT-ConfigurationPerServingCell" of the RRC IE).

As illustrated in FIG. 5, a given field that indicates a TRP (or a TRP ID) may be added to each pre-emption indication in the DCI format 2_1. The given field may indicate a specific TRP that has a cell ID associated with each pre-emption indication. The UE may determine a TRP to which each pre-emption indication is applied, based on a value of the given field.

When, for example, the TRPs 1 and 2 have the same cell IDs #1 (see FIGS. 2A and 2B), the UE may determine a TRP to which the pre-emption indication 1 is applied, based on the value of the given field added to the pre-emption indication 1 associated with the cell ID #1.

When, for example, the value of the given field is "0", the UE may apply the pre-emption indication 1 to the TRP 1 (or the TRP ID #1). When the value of the given field is "1", the UE may apply the pre-emption indication 1 to the TRP 2 (or the TRP ID #2). In addition, the TRP indicated by the value of the given field may be reverse to the above.

Thus, when a single serving cell (also referred to as, for example, a base station or a gNodeB (gNB)) includes 2 TRPs at maximum, the given field added to each pre-emption indication may be 1 bit. When the given field includes 1 bit, N bits only need to be added to the DCI format 2_1 including N pre-emption indications.

In addition, N given fields respectively associated with the N pre-emption indications in the DCI format 2_1 are added in FIG. 5 However, the present embodiment is not limited to this. For example, less than the N given fields (e.g., one field) associated with the N pre-emption indications may be added in the DCI format 2_1.

In the second TRP determination example, the DCI format 2_1 includes the given field that indicates a TRP to which each pre-emption indication is applied, so that, even when a plurality of TRPs have same cell IDs, the UE can appropriately determine a TRP to which each pre-emption indication in the DCI format 2_1 is applied.

Third TRP Determination Example

In the third TRP determination example, a TRP to which each pre-emption indication in the DCI format 2_1 is applied may be implicitly indicated in the above pre-emption information (e.g., "DownlinkPreemption" of the RRC IE).

Figure 6:
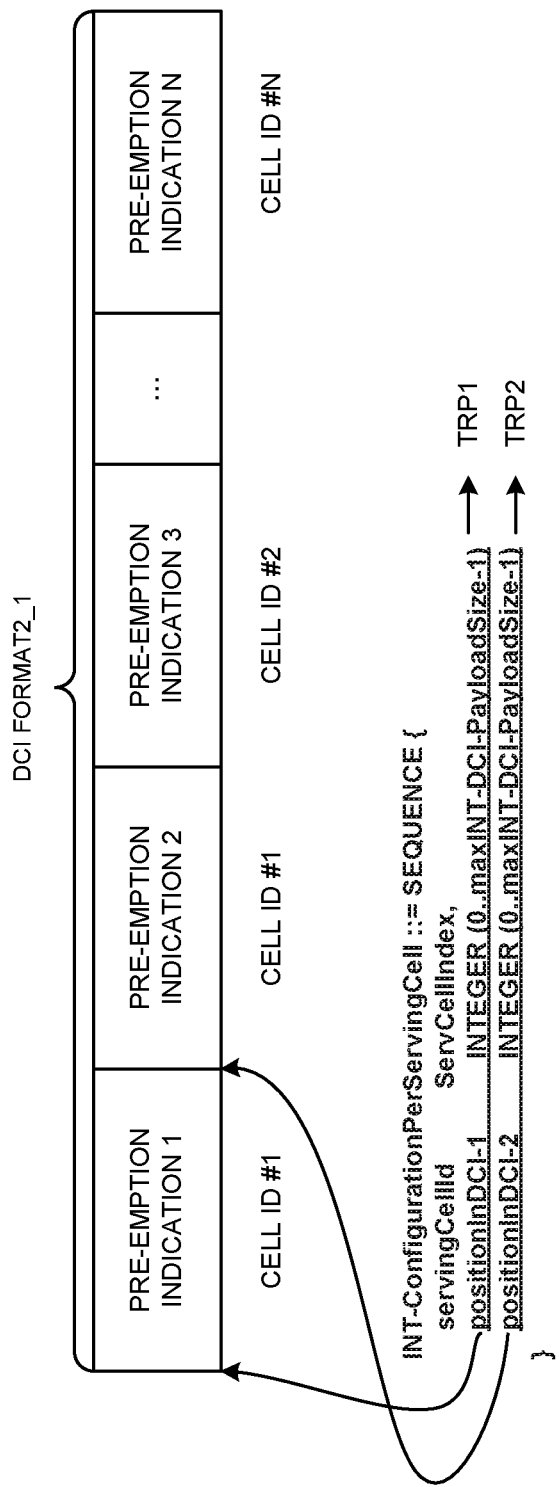
FIG. 6 is a diagram illustrating a third TRP determination example of the second application example of the DCI format 2_1 according to the first aspect.

FIG. 6 is a diagram illustrating the third TRP determination example of the second application example of the DCI format 2_1 according to the first aspect. Differences from FIG. 3, 4 or 5 will be mainly described with reference to FIG. 6.

As illustrated in FIG. 6, each pre-emption indication in the DCI format 2_1 may be associated with a cell ID and a TRP identifier (TRP ID).

More specifically, the above pre-emption information (e.g., "DownlinkPreemption" of the RRC IE) may include the configuration information related to the pre-emption indication (e.g., "INT-ConfigurationPerServingCell" of the RRC IE) per serving cell.

The configuration information may include a cell ID (e.g., "servingCellId" of the RRC IE), and position information of one or more pre-emption indications associated with the cell ID in the DCI format 2_1. For example, in FIG. 6, the configuration information includes first and second position information (e.g., "positionInDCI-1" and "positionInDCI-2" of the RRC IE) associated with one cell ID.

The first position information (e.g., "positionInDCI-1" of the RRC IE) may indicate a position of a pre-emption indication that is applied to one of a plurality of TRPs having same cell IDs. On the other hand, the second position information (e.g., "positionInDCI-2" of the RRC IE) may indicate a position of a pre-emption indication that is applied to the other one of a plurality of these TRPs.

For example, in FIG. 6, the first position information in configuration information for the cell ID #1 indicates a start position of the pre-emption indication that is applied to the TRP 1 having the cell ID #1. Furthermore, the second position information in the configuration information indicates a start position of the pre-emption indication that is applied to the TRP 2 having the cell ID #1. Thus, each position information in the configuration information may be associated with each TRP having a cell ID in the configuration information.

When the TRPs 1 and 2 have the same cell IDs #1 as illustrated in FIGS. 2A and 2B, the UE may assume that the pre-emption indication 1 indicated by the first position information in the configuration information of the cell ID #1 is applied to DL transmission from the TRP 1. On the other hand, the UE may assume that the pre-emption indication 2 indicated by the second position information in the configuration information of the cell ID #1 is applied to DL transmission from the TRP 2.

In the third TRP determination example, the configuration information per serving cell (e.g., "INT-ConfigurationPerServingCell" of the RRC IE) includes position information associated with each TRP, so that, even when a plurality of TRPs have same cell IDs, the UE can appropriately determine a TRP to which each pre-emption indication in the DCI format 2_1 is applied.

As described above, according to the first aspect, when one of a plurality of TRPs that transmit PDSCHs to the UE transmits UE-group common DCI (e.g., DCI format 2_1), and when a plurality of these TRPs have same cell IDs, it is possible to appropriately perform control based on the UE-group common DCI.

(Second Aspect)

In the second aspect, a plurality of TRPs that transmit PDSCHs to a UE each transmit a plurality of pieces of UE-group common DCI. The second aspect will mainly describe differences from the first aspect. One example of the UE-group common DCI is exemplified as a DCI format 2_1 below, yet is applicable to another DCI format 2_x (x=0, 2 or 3), too.

In the second aspect, a plurality of PDSCHs respectively transmitted from a plurality of these TRPs may be scheduled by a plurality of DL assignments respectively transmitted from a plurality of these TRPs (e.g., multiple PDCCHs in FIG. 1B or 1C).

Figure 7:
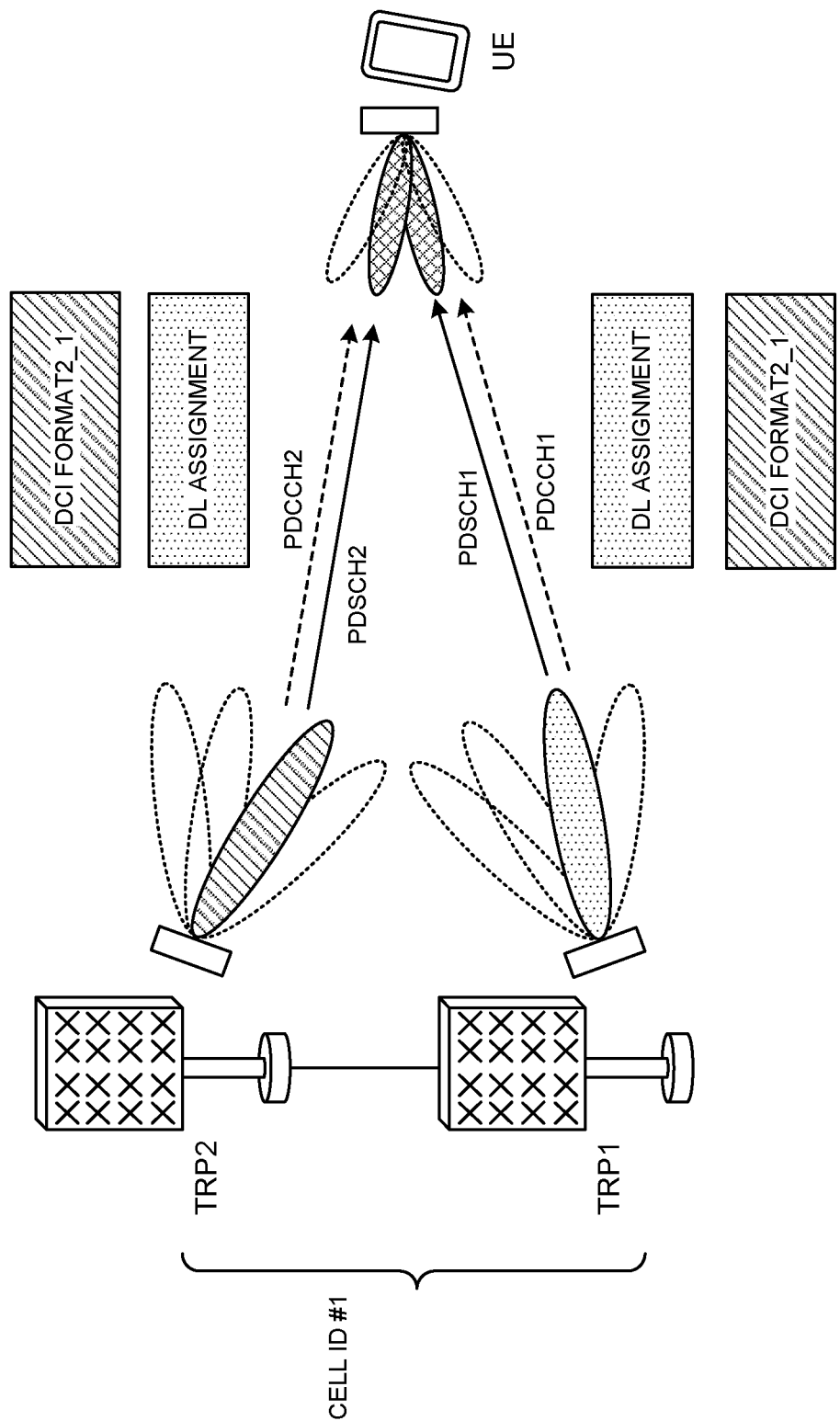
FIG. 7 is a diagram illustrating one example of transmission of a DCI format 2_1 according to a second aspect.

FIG. 7 is a diagram illustrating one example of transmission of the DCI format 2_1 according to the second aspect. In FIG. 7, the number of TRPs that transmit PDSCHs and the DCI formats 2_1 to the UE is 2, yet may be 2 or more. Furthermore, FIG. 7 assumes that TRPs 1 and 2 have same cell IDs #1 in one example.

Furthermore, in FIG. 7, the TRPs 1 and 2 may be connected by an ideal backhaul or a low latency non-ideal backhaul (see FIG. 1B), or may be connected by a large latency non-ideal backhaul (see FIG. 1C).

In FIG. 7, a PDSCH 1 transmitted from the TRP 1 is scheduled by a DL assignment transmitted from the TRP 1 via a PDCCH 1, or a PDSCH 2 transmitted from the TRP 2 is scheduled by a DL assignment transmitted from the TRP 2 via a PDCCH 2.

When PDSCHs from a plurality TRPs are scheduled by the PDCCHs from a plurality of these respective TRPs as illustrated in FIG. 7, the DCI formats 2_1 may be also transmitted from a plurality of these respective TRPs. A relevant higher layer signalling (higher layer parameter) (e.g., RRC signalling (RRC IE)) may be transmitted from at least one of a plurality of these TRPs.

In FIG. 7, the UE may monitor a given search space set (e.g., Type 3-PDCCH CSS set), and detect the DCI format 2_1 CRC-scrambled by a given RNTI (e.g., INT-RNTI).

The given search space set may be configured to the UE per at least one of a serving cell, a BWP and a TRP. A periodicity of the given search space set and at least one of time domain resources and frequency domain resources may be configured by a higher layer parameter.

The given search space set may be associated with a given CORESET. The given CORESET may be configured to the UE per at least one of the serving cell, the BWP and the TRP.

When each TRP transmits the DCI format 2_1 as illustrated in FIG. 7, the UE may determine a TRP that becomes an application target of the DCI format 2_1. For example, the UE may determine the TRP that becomes the application target of the DCI format 2_1 based on at least one of followings.

A CORESET

A search space

PDCCH configuration information (e.g., "PDCCH-Config" of the RRC IE)

A CDM group of DMRS ports of a PDSCH or a PDCCH

A value of a given RNTI (e.g., INT-RNTI)

A value of a given field (e.g., TRP ID) that is added to each pre-emption indication in the DCI format 2_1

Configuration information related to a pre-emption indication (e.g., "INT-ConfigurationPerServingCell" of the RRC IE)

A sequence used for scrambling initialization of a DMRS of a PDCCH (e.g., "pdcch-DMRS-ScramblingID" of the RRC IE)

<TRP Determination Example Based on CORESET>

The UE may determine a TRP that becomes an application target of the DCI format 2_1 based on a CORESET associated with a given search space set (e.g., Type 3-PDCCH CSS set) for monitoring the DCI format 2_1 from each TRP.

Configuration information of a PDCCH per serving cell or per BWP (PDCCH configuration information such as "PDCCH-Config" of the RRC IE) may include a list (e.g., "controlResourceSetToAddModList" of the RRC IE) of configuration information of one or more CORESETs (CORESET configuration information such as "PDCCH-Config" of the RRC IE).

Furthermore, the configuration information of the PDCCH may include a list (e.g., "searchSpacesToAddModList" of the RRC IE) of configuration information of one or more search space sets (search space configuration information such as "SearchSpace" of the RRC IE).

Each TRP may correspond to (be associated with) a CORESET configured by one CORESET configuration information in the above PDCCH configuration information. That is, a CORESET may be configured to the UE per TRP.

The UE may assume that the DCI formats 2_1 respectively detected by a plurality of search space sets (e.g., Type 3-PDCCH CSS sets) associated with different CORESETs are applied to different TRPs.

Non-overlapped time domain resources and frequency domain resources may be allocated to a plurality of CORESETs associated with the different TRPs. Alternatively, at least part of the time domain resources and the frequency domain resources allocated to a plurality of these CORESETs may overlap.

FIGS. 8A and 8B are diagrams illustrating TRP determination examples based on CORESETs according to the second aspect. FIGS. 8A and 8B assume that both of the TRPs 1 and 2 transmit the DCI format 2_1 as illustrated in FIG. 7. In addition, a search space set of search space IDs x (x=1 and 2) illustrated in FIGS. 8A and 8B may be expressed as a search space set x (x=1 or 2). Furthermore, the search space set x may be, for example, the Type 3-PDCCH CSS set.

In FIG. 8A, CORESETs 1 and 2 do not overlap in at least one of a time domain and a frequency domain. That is, in FIG. 8A, the CORESETs 1 and 2 may be allocated to exclusive frequency domain resources (e.g., one or more PRBs) and time domain resources (e.g., one or more symbols).

In FIG. 8A, the CORESETs 1 and 2 are associated with the respectively different TRPs 1 and 2. When detecting the DCI format 2_1 in the search space set 1 associated with the CORESET 1, the UE may apply the DCI format 2_1 to the TRP 1 associated with the CORESET 1.

Furthermore, when detecting the DCI format 2_1 in the search space set 2 associated with the CORESET 2, the UE may apply the DCI format 2_1 to the TRP 1 associated with the CORESET 2.

On the other hand, in FIG. 8B, the CORESETs 1 and 2 overlap in at least part of the time domain and at least part of the frequency domain. That is, in FIG. 8B, the CORESETs 1 and 2 may be allocated to the frequency domain resources (e.g., one or more PRBs) and time domain resources (e.g., one or more symbols) that partially or completely overlap.

When the frequency domain resources and the time domain resources allocated to the CORESETs 1 and 2 at least partially overlap as illustrated in FIG. 8B, even if the CORESETs 1 and 2 have different QCLs, there is a risk that the UE cannot determine which TRP the detected DCI format 2_1 belongs to.

Therefore, the UE may determine a TRP that becomes an application target of the DCI format 2_1 detected in a search space set associated with a given CORESET based on one of following (1) to (4).

(1) A value of an RNTI (e.g., INT-RNTI) used to CRC-scramble the DCI format 2_1
(2) A value of a given field (e.g., TRP ID) added to each pre-emption indication in the detected DCI format 2_1
(3) Configuration information related to the pre-emption indication (e.g., "INT-ConfigurationPerServingCell" of the RRC IE)
(4) A sequence (e.g., "pdcch-DMRS-ScramblingID" of the RRC IE) used for scrambling initialization of a DMRS of a PDCCH For example, in a case based on (1), a TRP may be associated with the RNTI (e.g., INT-RNTI) (or a value of the RNTI) used to CRC-scramble the DCI format 2_1. In this case, (the value of) the RNTI may be given to the UE per TRP by a higher layer parameter. By performing monitoring (blind-decoding) that uses the RNTI associated with each TRP, the UE may apply the DCI format 2_1 to the TRP associated with the RNTI whose DCI format 2_1 has been successfully detected.

Furthermore, n a case based on (2), as described in the second TRP determination example (e.g., FIG. 5) according to the first aspect, a given field that indicates a TRP (or a TRP ID) may be added in the DCI format 2_1. The UE may apply the DCI format 2_1 (or each pre-emption indication in the DCI format 2_1) to the TRP indicated by the value of the given field in the detected DCI format 2_1.

Furthermore, in a case based on (3), as described in the first TRP determination example (e.g., FIG. 4) according to the first aspect, information that indicates a TRP to which each pre-emption indication is applied (e.g., "trpId" of the RRC IE in FIG. 4) may be included in the configuration information related to the pre-emption indication (e.g., "INT-ConfigurationPerServingCell" of the RRC IE).

Alternatively, in the case based on (3), as described in the third TRP determination example (e.g., FIG. 6) according to the first aspect, position information of each pre-emption indication associated with each TRP (e.g., "positionInDCI-1" and "positionInDCI-2" of the RRC IE in FIG. 6) may be included in the configuration information related to the pre-emption indication (e.g., "INT-ConfigurationPerServingCell" of the RRC IE).

Furthermore, in a case based on (4), a TRP may be associated with a sequence (or an ID of the sequence) for scrambling initialization of a DMRS of a PDCCH for conveying the DCI format 2_1. In this case, the sequence may be given to the UE per TRP by a higher layer parameter.

FIGS. 9A and 9B are diagrams illustrating TRP determination examples based on sequence IDs according to the second aspect. FIGS. 9A and 9B assume that a plurality of sequences (or sequence IDs) are configured to the UE for each CORESET. For example, FIGS. 9A and 9B assume that sequence IDs #n and m are given to the UE for the CORESETs 1 and 2, respectively. However, the present embodiment is not limited to this. For example, in FIGS. 9A and 9B, the sequence ID #n is associated with the TRP 1, and the sequence ID #m is associated with the TRP 2.

When detecting the DCI format 2_1 in the PDCCH that is demodulated by using a DMRS sequence generated based on the sequence ID #n as illustrated in FIGS. 9A and 9B, the UE may assume that the DCI format 2_1 indicates pre-emption to DL transmission (e.g., PDSCH) from the TRP 1 associated with the sequence ID #n. That is, the UE may assume that pre-emption is indicated to the PDSCH that is scheduled by the PDCCH of the DMRS sequence generated based on the sequence ID #n.

On the other hand, when detecting the DCI format 2_1 in the PDCCH that is demodulated by using a DMRS sequence generated based on the sequence ID #m, the UE may assume that the DCI format 2_1 indicates pre-emption to DL transmission (e.g., PDSCH) from the TRP 2 associated with the sequence ID #m. That is, the UE may assume that pre-emption is indicated to the PDSCH that is scheduled by the PDCCH of the DMRS sequence generated based on the sequence ID #m.

Determination of a TRP based on the above sequence (or sequence ID) may be used when a plurality of CORESETs respectively associated with a plurality of TRPs overlap (FIG. 9B), or may be used when a plurality of these CORESETs do not overlap (FIG. 9A). The CORESETs and the TRPs are associated in FIG. 9A. However, the CORESETs and the TRPs may not be associated, and a TRP that becomes an application target of the DCI format 2_1 may be determined according to the association between the above sequences (or sequence IDs) and the TRPs.

<TRP Determination Example Based on Other Parameters>

The UE may determine a TRP that becomes the application target of the DCI format 2_1 based on a given search space set (e.g., Type 3-PDCCH CSS set) for monitoring the DCI format 2_1 from each TRP.

Each TRP may correspond to (be associated with) a search space set configured by one search space configuration information in the above PDCCH configuration information. That is, the search space set may be configured to the UE per TRP.

The UE may assume that the DCI formats 2_1 respectively detected in different search space sets (e.g., Type 3-PDCCH CSS sets) are applied to different TRPs. The different search space sets may be associated with an same CORESET, or may be associated with different CORESETs.

Alternatively, the UE may determine the TRP that becomes the application target of the DCI format 2_1 based on PDCCH configuration information (e.g., "PDCCH-Config" of the RRC IE) including configuration information of a given search space set for monitoring the DCI format 2_1 from each TRP, and configuration information of a CORESET associated with the given search space set.

Each TRP may correspond to (be associated with) the above PDCCH configuration information. That is, the PDCCH configuration information may be configured to the UE per TRP.

Alternatively, the UE may determine the TRP that becomes the application target of the DCI format 2_1 based on a CDM group of DMRS ports of the PDSCH (or the PDCCH) from each TRP. Each TRP may correspond to (be associated with) the above CDM group.

As described above, according to the second aspect, when a plurality of TRPs that transmit PDSCHs to the UE each transmit UE-group common DCI (e.g., DCI format 2_1), and even when a plurality of these TRPs have same cell IDs, it is possible to appropriately perform control based on the UE-group common DCI.

(Other Aspect)

A UE may switch and use the above first aspect and second aspect. When, for example, a plurality of TRPs are connected by an ideal backhaul or a low latency non-ideal backhaul (in a case of a type where latency between the TRPs is relatively low) in a case of multiple PDCCHs (FIGS. 1B and 1C), the first aspect that a single TRP transmits UE-group common DCI may be applied to the UE.

On the other hand, when a plurality of TRPs are connected by a large latency non-ideal backhaul (in a case of a type where latency between the TRPs is relatively large), the second aspect that a plurality of these TRPs each transmit the UE-group common DCI may be applied to the UE. Thus, the first aspect and the second aspect may be switched according to a communication type.

Furthermore, the above first and second aspects are applicable to other pieces of UE-group common DCI (e.g., DCI formats 2_0, 2_2 and 2_3), too, other than a DCI format 2_1. The DCI format 2_1 according to the first and second aspects may be read as the DCI format 2_0, 2_2 or 2_3. Cases where the DCI format 2_1 is read as the DCI format 2_0, 2_2 or 2_3 will be supplemented below.

<DCI Format 2_0>

Figure 10:
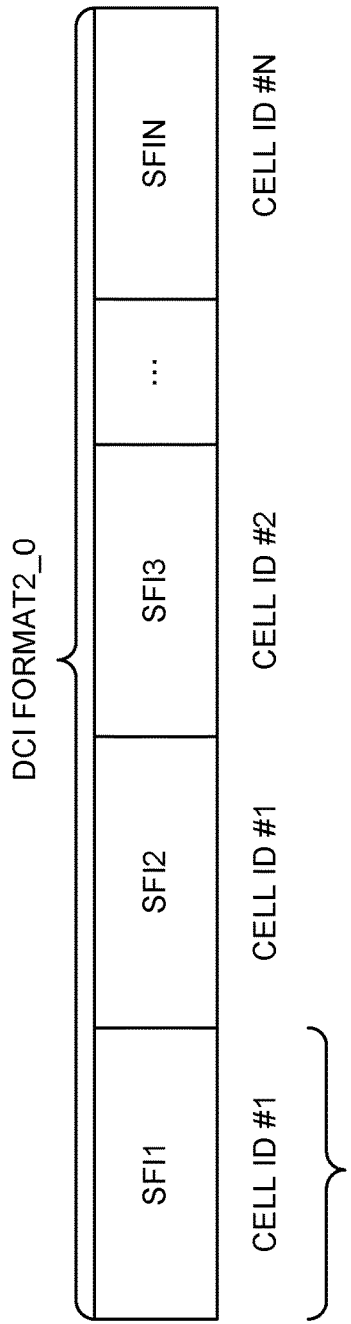
FIG. 10 is a diagram illustrating one example of a DCI format 2_0 according to another aspect.

FIG. 10 is a diagram illustrating one example of the DCI format 2_0 according to the another aspect. As illustrated in FIG. 10, the DCI format 2_0 may include N (N≥1) Slot Format Indicators (SFIs). Each SFI may be associated with a cell ID.

The UE receives information (e.g., "SlotFormatIndicator" of the RRC IE) related to a PDCCH (group common PDCCH) for the SFI. The information may include configuration information related to each SFI (e.g., "SlotFormatCombinationsPerCell" of the RRC IE) per serving cell.

The configuration information may include a cell ID (e.g., "servingCellId" of the RRC IE), a subcarrier spacing (e.g., "subcarrierSpacing" of the RRC IE), and information (position information such as "positionInDCI" of the RRC IE) that indicates a position of an SFI associated with the cell ID in the DCI format 2_0. The UE may use the SFI in the DCI format 2_0 indicated by the position information for transmission power control of a PUSCH of a cell of the cell ID.

In the first application example according to the first aspect, when the DCI format 2_0 illustrated in FIG. 10 is transmitted from one of a plurality of TRPs (e.g., a TRP 1 in FIGS. 2A and 2B) that transmit PDSCHs, the DCI format 2_0 may be applied to both of a plurality of these TRPs (e.g., TRPs 1 and 2 in FIGS. 2A and 2B). On the other hand, in the second application example, a single TRP to which the DCI format 2_0 is applied among a plurality of these TRPs may be determined as described in the first to third TRP determination examples.

For example, in the first TRP determination example, configuration information (e.g., "SlotFormatCombinationsPerCell" of the RRC IE) illustrated in FIG. 10 may further include information that indicates a TRP (see, for example, "trpID" of FIG. 4).

Furthermore, in the second TRP determination example according to the first aspect, a given field that indicates a TRP associated with each SFI in the DCI format 2_0 (see, for example, a TRP ID in FIG. 5) may be added.

Furthermore, in the third TRP determination example according to the first aspect, the configuration information (e.g., "SlotFormatCombinationsPerCell" of the RRC IE) may include position information of the SFI of each TRP in the DCI format 2_0 (see, for example, "positionInDCI-1" and "positionInDCI-2" in FIG. 6).

Furthermore, according to the second aspect, when the DCI formats 2_0 illustrated in FIG. 10 are transmitted from a plurality of TRPs (e.g., the TRPs 1 and 2 in FIG. 7) that transmit PDSCHs, the UE may determine the single TRP to which the DCI format 2_0 is applied among a plurality of these TRPs as described in the second aspect.

<DCI Format 2_2>

Figure 11:
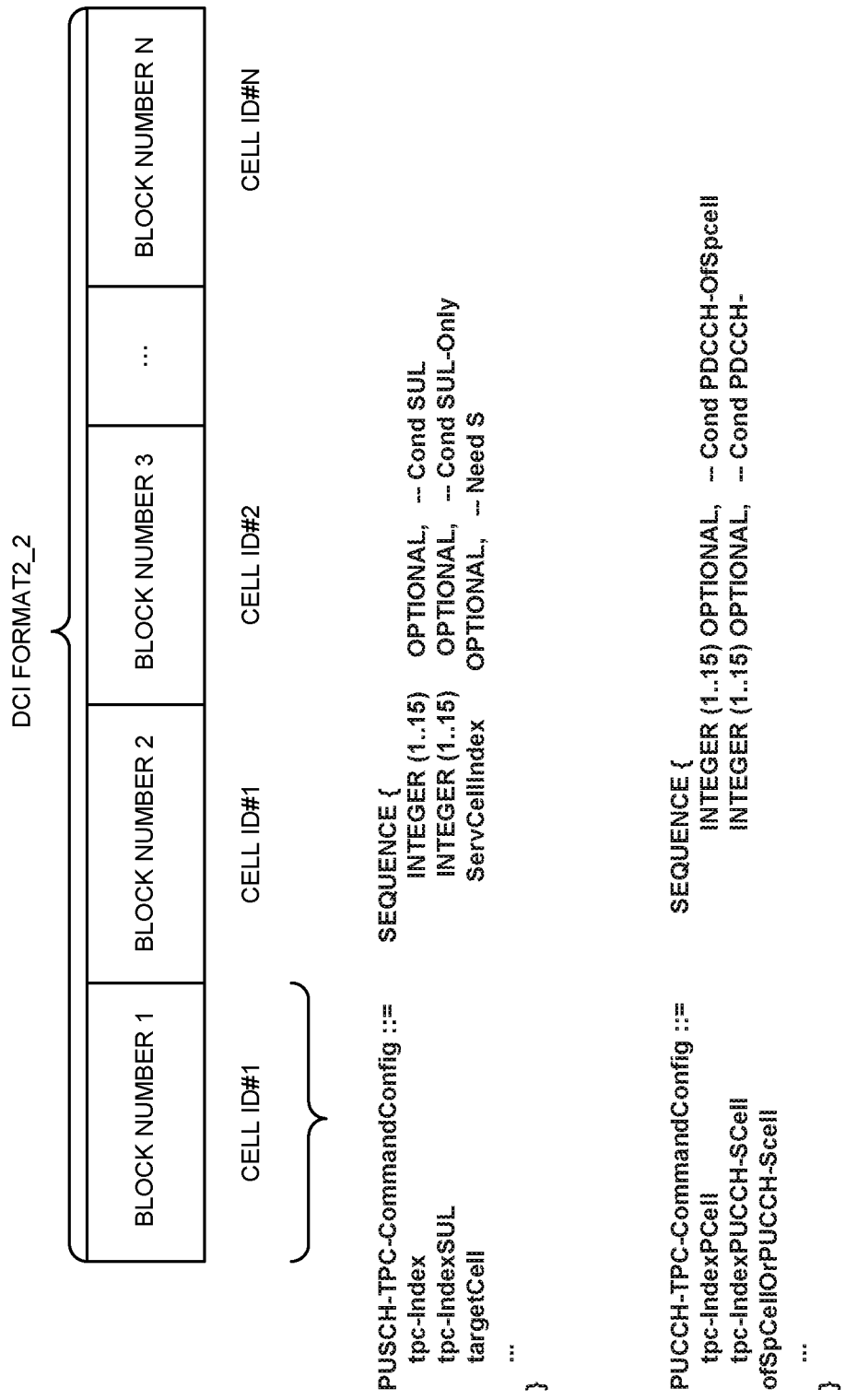
FIG. 11 is a diagram illustrating one example of a DCI format 2_2 according to the another aspect.

FIG. 11 is a diagram illustrating one example of the DCI format 2_2 according to the another aspect. As illustrated in FIG. 11, the DCI format 2_2 may include N (N≥1) blocks. Each block may include a TPC command.

The above PDCCH configuration information (e.g., "PDCCH-Config" of the RRC IE) may include at least one of information related to reception of a group TPC command of a PUSCH (PUSCH-TPC information such as "PUSCH-TPC-CommandConfig" of the RRC IE), and information related to reception of a group TPC command of a PUCCH (PUCCH-TPC information such as "PUCCH-TPC-CommandConfig" of the RRC IE).

The PUSCH-TPC information may include a cell ID (e.g., "targetCell" of the RRC IE), and information that indicates a position of a TPC command associated with the cell ID in the DCI format 2_2 (position information such as "tpc-Index" of the RRC IE). The UE may use the TPC command in the DCI format 2_2 indicated by the position information for transmission power control of the PUSCH of a cell of the cell ID.

The PUCCH-TPC information may include information that indicates positions of TPC commands associated with a primary cell and a secondary cell in the DCI format 2_2 (position information such as "tpc-IndexPCell" and "tpc-IndexPUCCH-SCell" of the RRC IE). The UE may use the TPC command in the DCI format 2_2 indicated by the position information for transmission power control of a PUCCH of at least one of the primary cell and the secondary cell.

In the first application example according to the first aspect, when the DCI format 2_2 illustrated in FIG. 11 is transmitted from one of a plurality of TRPs (e.g., the TRP 1 in FIGS. 2A and 2B) that transmit PDSCHs, the DCI format 2_2 may be applied to both of a plurality of these TRPs (e.g., the TRPs 1 and 2 in FIGS. 2A and 2B). On the other hand, in the second application example, a single TRP to which the DCI format 2_2 is applied among a plurality of these TRPs may be determined as described in the first to third TRP determination examples.

For example, in the first TRP determination example, PUSCH-TPC information (e.g., "PUSCH-TPC-CommandConfig" of the RRC IE) and PUCCH-TPC information (e.g., "PUCCH-TPC-CommandConfig" of the RRC IE) illustrated in FIG. 11 may further include information that indicates a TRP (see, for example, "trpID" of FIG. 4).

Furthermore, in the second TRP determination example according to the first aspect, a given field that indicates a TRP to which a TPC command in each block in the DCI format 2_2 is applied (see, for example, the TRP ID in FIG. 5) may be added.

Furthermore, in the third TRP determination example according to the first aspect, the PUSCH-TPC information (e.g., "PUSCH-TPC-CommandConfig" of the RRC IE) may include position information of a TPC command of each TRP in the DCI format 2_2 (see, for example, "tpc-Index-1" and "tpc-Index-2" enhanced from "tpc-Index" in FIG. 11 for 2 TRPs).

Similarly, the PUCCH-TPC information (e.g., "PUCCH-TPC-CommandConfig" of the RRC IE) may include position information of a TPC command of each TRP in the DCI format 2_2 (see, for example, "tpc-IndexPCell-1" and "tpc-IndexPCell-2" enhanced from "tpc-IndexPCell" in FIG. 11 for 2 TRPs, and "tpc-IndexSCell-1" and "tpc-IndexSCell-2" enhanced from "tpc-IndexSCell" for 2 TRPs).

Furthermore, according to the second aspect, when the DCI formats 2_2 illustrated in FIG. 11 are transmitted from a plurality of TRPs (e.g., the TRPs 1 and 2 in FIG. 7) that transmit PDSCHs, the UE may determine the single TRP to which the DCI format 2_2 is applied among a plurality of these TRPs as described in the second aspect.

<DCI Format 23>

Figure 12:
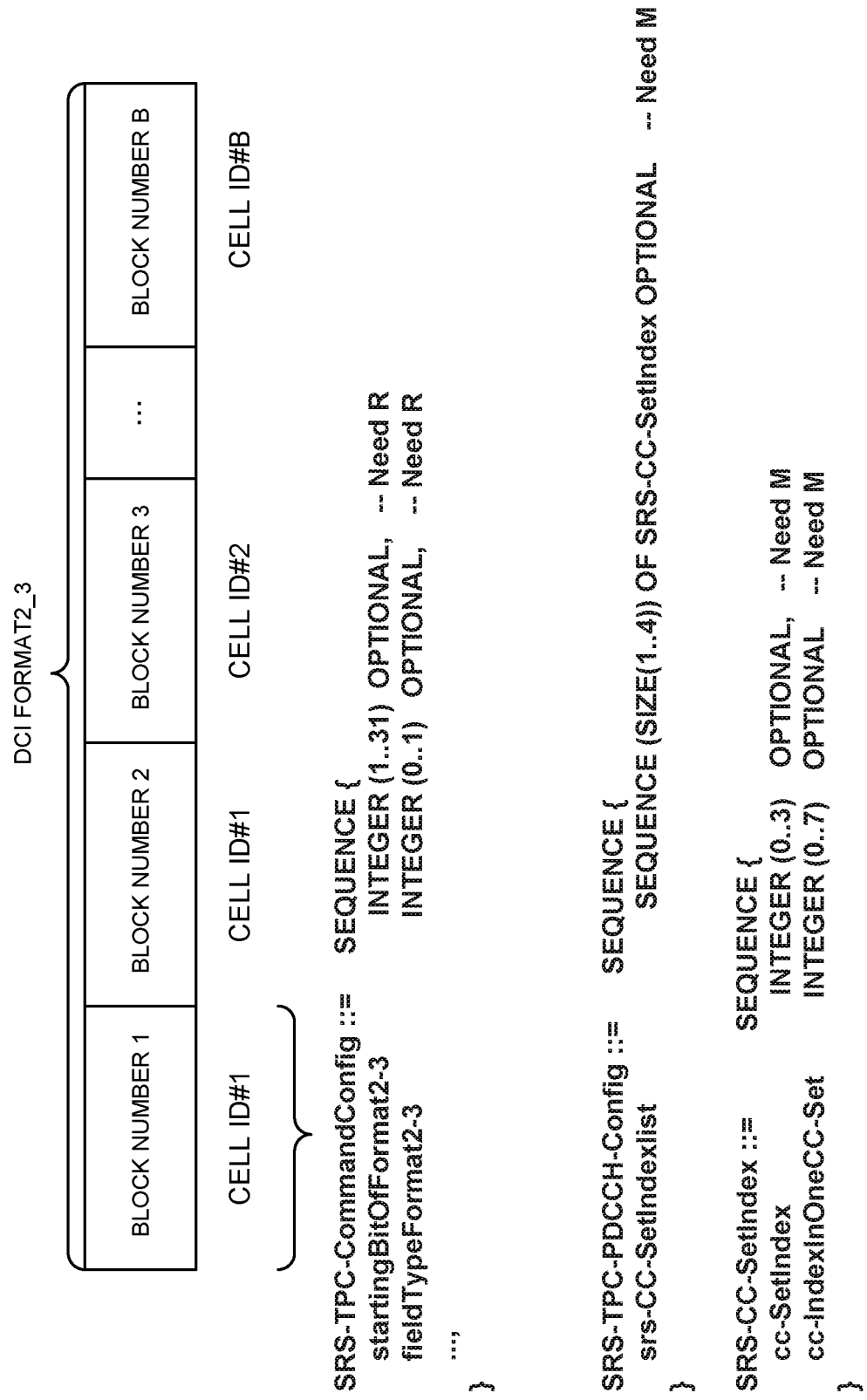
FIG. 12 is a diagram illustrating one example of a DCI format 2_3 according to the another aspect.

FIG. 12 is a diagram illustrating one example of the DCI format 2_3 according to the another aspect. As illustrated in FIG. 12, the DCI format 2_3 may include B (B≥1) blocks. Each block may indicate, for example, a TPC command, and the user terminal may control an SRS or a cell for which a TPC command is reflected based on each block. In addition, a number (block number) may be assigned to each of the B blocks.

Furthermore, the above DCI format may include a field (SRS request field) for requesting SRS transmission from the user terminal. The SRS request field may include a given block. A value of the SRS request field may indicate for which cell (also referred to as, for example, a CC, a serving cell or a carrier) SRS transmission is requested.

The above PDCCH configuration information (e.g., "PDCCH-Config" of the RRC IE) include information related to a TPC command for an SRS (SRS-TPC information such as "SRS-TPC-CommandConfig" and "SRS-TPC-PDCCH-Config" of the RRC IE).

The SRS-TPC information may include a cell ID (e.g., "SRS-CC-SetIndex" in "SRS-TPC-PDCCH-Config" of the RRC IE), and information that indicates a position of a TPC command in the DCI format 2_3 (position information such as "startingBitOfFormat2-3" in "SRS-TPC-CommandConfig" of the RRC IE). The UE may use the TPC command in the DCI format 2_3 indicated by the position information for transmission power control of the SRS of a cell of the cell ID.

In the first application example according to the first aspect, when the DCI format 2_3 illustrated in FIG. 12 is transmitted from one of a plurality of TRPs (e.g., the TRP 1 in FIGS. 2A and 2B) that transmit PDSCHs, the DCI format 2_3 may be applied to both of a plurality of these TRPs (e.g., the TRPs 1 and 2 in FIGS. 2A and 2B). On the other hand, in the second application example, a single TRP to which the DCI format 2_3 is applied among a plurality of these TRPs may be determined as described in the first to third TRP determination examples.

For example, in the first TRP determination example, SRS-TPC information (e.g., "SRS-TPC-CommandConfig" or "SRS-TPC-PDCCH-Config" of the RRC IE) illustrated in FIG. 12 may further include information that indicates a TRP (see, for example, "trpID" of FIG. 4).

Furthermore, in the second TRP determination example according to the first aspect, a given field that indicates a TRP to which a TPC command in each block in the DCI format 2_3 is applied (see, for example, a TRP ID in FIG. 5) may be added.

Furthermore, in the third TRP determination example according to the first aspect, the SRS-TPC information (e.g., "SRS-TPC-CommandConfig" of the RRC IE) may include position information of the TPC command of each TRP in the DCI format 2_3 (see, for example, "startingBitOfFormat2-3-1" and "startingBitOfFormat2-3-2" enhanced from "startingBitOfFormat2-3" in FIG. 12 for 2 TRPs).

Furthermore, according to the second aspect, when the DCI formats 2_3 illustrated in FIG. 12 are transmitted from a plurality of TRPs (e.g., the TRPs 1 and 2 in FIG. 7) that transmit PDSCHs, the UE may determine the single TRP to which the DCI format 2_3 is applied among a plurality of these TRPs as described in the second aspect.

(Radio Communication System)

The configuration of the radio communication system according to one embodiment of the present disclosure will be described below. This radio communication system uses one or a combination of the radio communication method according to each of the above embodiment of the present disclosure to perform communication.

Figure 13:
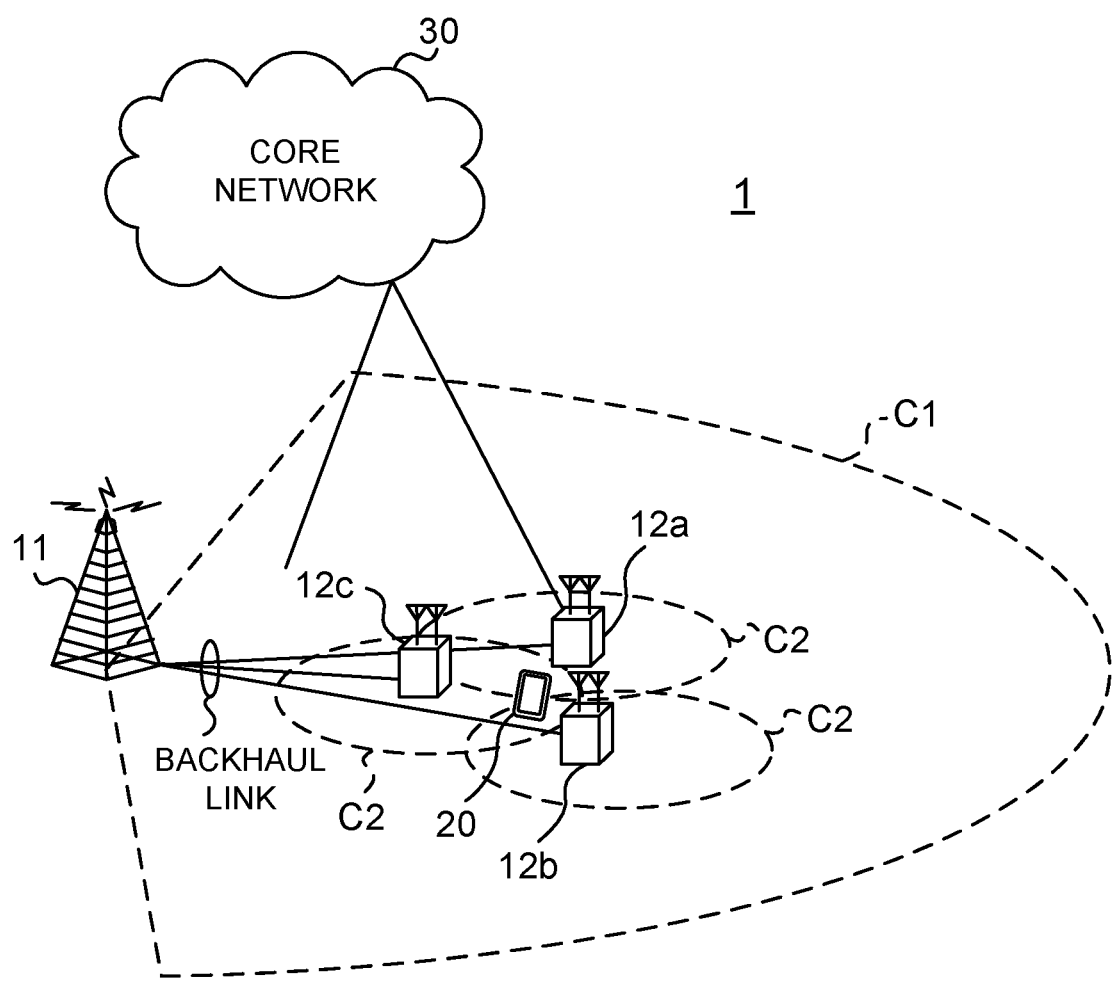
FIG. 13 is a diagram illustrating one example of a schematic configuration of a radio communication system according to one embodiment.

FIG. 13 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NR-E-UTRA Dual Connectivity (NE-DC)) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 may include a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 13. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR 1)) and a second frequency range (Frequency Range 2 (FR2)). The macro cell C1 may be included in the FR 1, and the small cell C2 may be included in the FR2. For example, the FR 1 may be a frequency range equal to or less than 6 GHz (sub-6 GHz), and the FR 2 may be a frequency range higher than 24 GHz (above-24 GHz). In addition, the frequency ranges and definitions of the FR 1 and the FR 2 are not limited to these, and, for example, the FR 1 may correspond to a frequency range higher than the FR 2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as a backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the another base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 may use an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

(Base Station)

Figure 14:
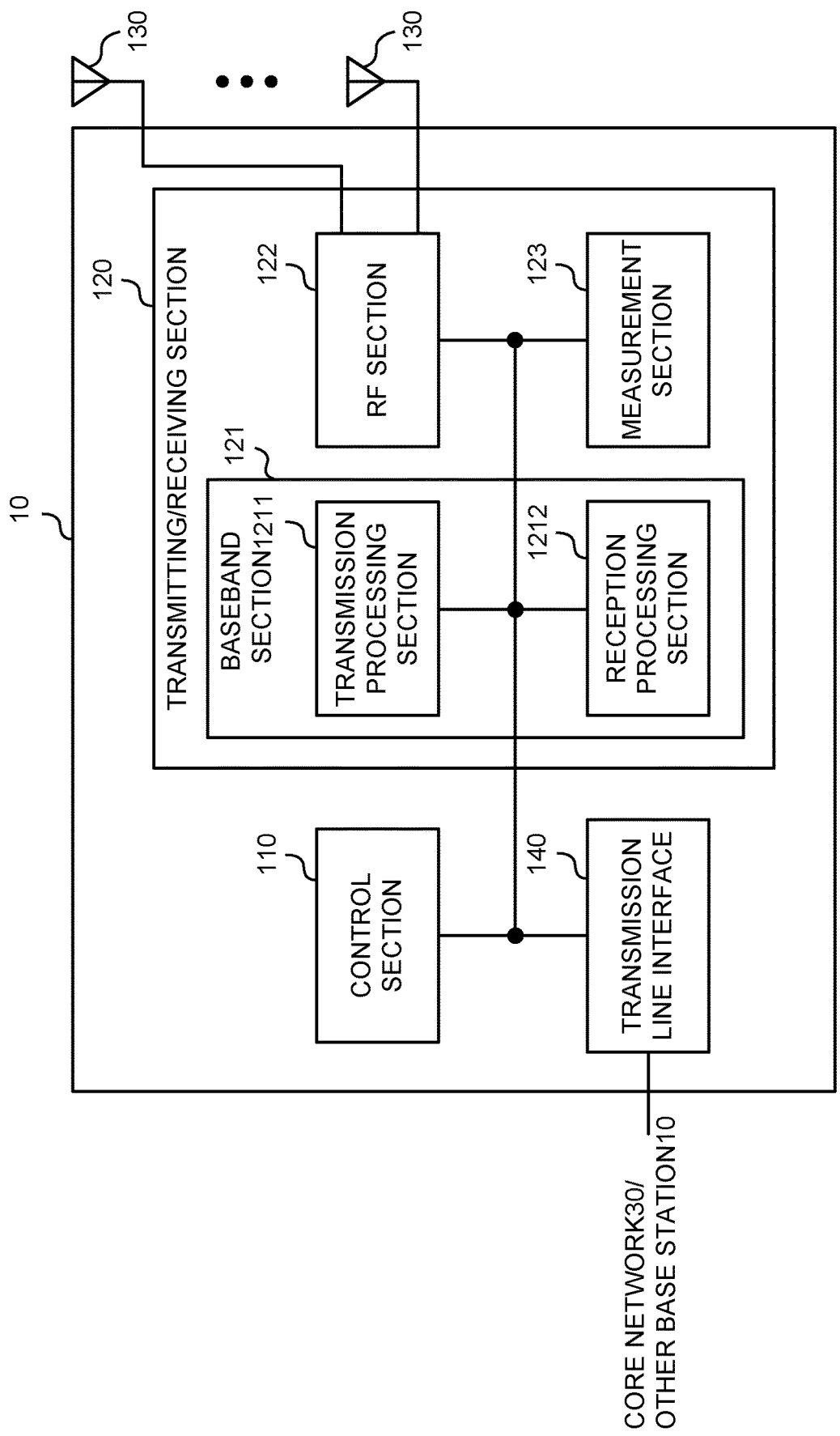
FIG. 14 is a diagram illustrating one example of a configuration of a base station according to the one embodiment.

FIG. 14 is a diagram illustrating one example of a configuration of the base station according to the one embodiment. The base station 10 includes a control section 110, a transmitting/receiving section 120, transmission/reception antennas 130 and a transmission line interface 140. In addition, the base station 10 may include one or more of each of the control sections 110, the transmitting/receiving sections 120, the transmission/reception antennas 130 and the transmission line interfaces 140.

In addition, this example mainly illustrates function blocks of characteristic portions according to the present embodiment, and may assume that the base station 10 has other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmission/reception antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 120 may be composed as an integrated transmitting/receiving section, or may be composed of a transmitting section and a receiving section. The transmitting section may be composed of the transmission processing section 1211 and the RF section 122. The receiving section may be composed of the reception processing section 1212, the RF section 122 and the measurement section 123.

The transmission/reception antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmission/reception antennas 130.

On the other hand, the transmitting/receiving section 120 (RF section 122) may perform amplification and filter processing on the signal of the radio frequency range received by the transmission/reception antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signalling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120, the transmission/reception antenna 130 and the transmission line interface 140.

In addition, the transmitting/receiving section 120 transmits downlink control information that is common between groups including one or more user terminals. The transmitting/receiving section 120 transmits a downlink shared channel. The transmitting/receiving section 120 may transmit the downlink control information used for scheduling of the downlink shared channel.

(User Terminal)

Figure 15:
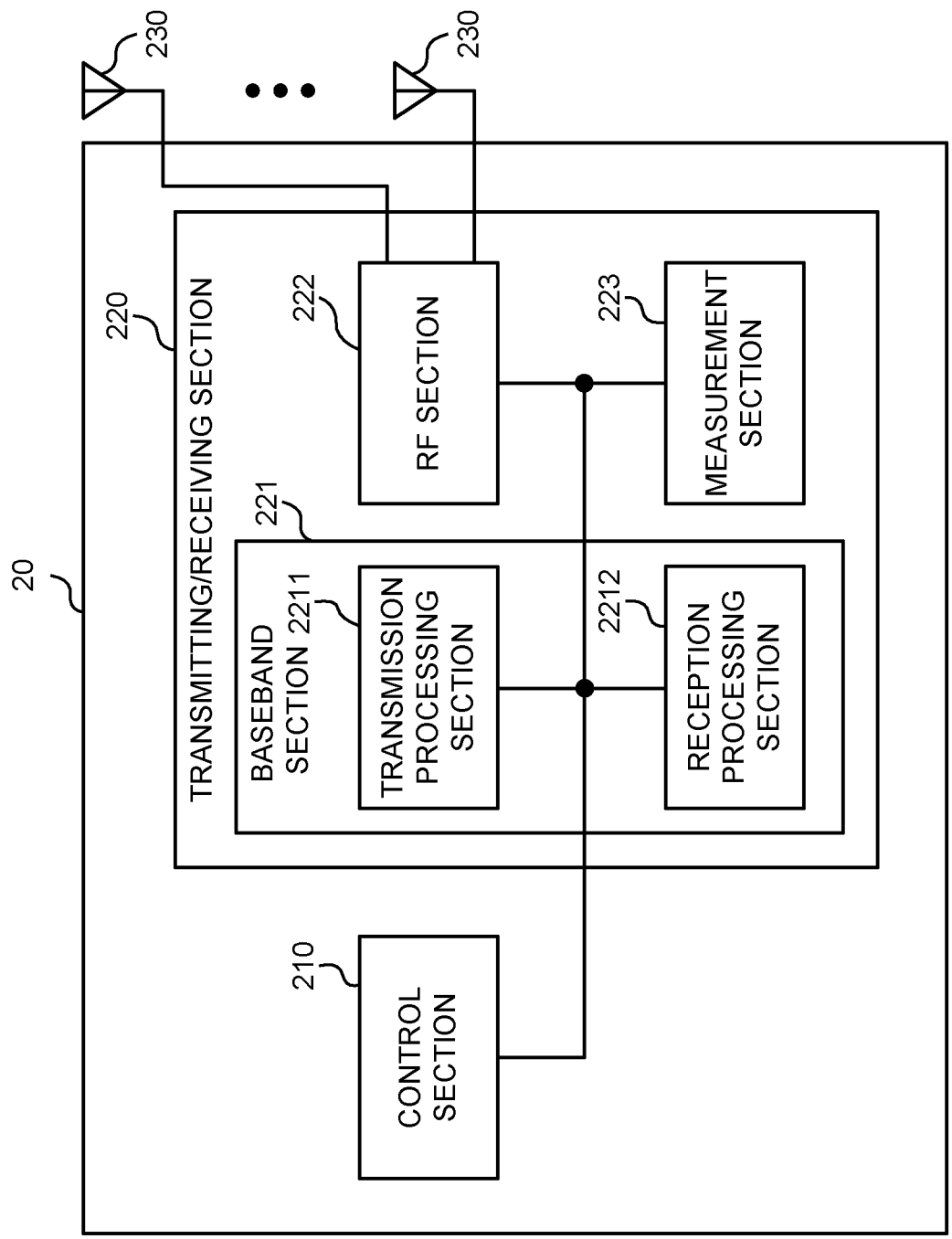
FIG. 15 is a diagram illustrating one example of a configuration of a user terminal according to the one embodiment.

FIG. 15 is a diagram illustrating one example of a configuration of the user terminal according to the one embodiment. The user terminal 20 includes a control section 210, a transmitting/receiving section 220 and transmission/reception antennas 230. In this regard, the user terminal 20 may include one or more of each of the control sections 210, the transmitting/receiving sections 220 and the transmission/reception antennas 230.

In addition, this example mainly illustrates function blocks of characteristic portions according to the present embodiment, and may assume that the user terminal 20 has other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmission/reception antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 220 may be composed as an integrated transmitting/receiving section, or may be composed of a transmitting section and a receiving section. The transmitting section may be composed of the transmission processing section 2211 and the RF section 222. The receiving section may be composed of the reception processing section 2212, the RF section 222 and the measurement section 223.

The transmission/reception antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmission/reception antennas 230.

On the other hand, the transmitting/receiving section 220 (RF section 222) may perform amplification and filter processing on the signal of the radio frequency range received by the transmission/reception antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform, for example, RRM measurement or CSI measurement based on the received signal. The measurement section 223 may measure, for example, received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220, the transmission/reception antenna 230 and the transmission line interface 240.

In addition, the transmitting/receiving section 220 receives the downlink control information that is common between the groups including the one or more user terminals from at least one of a plurality of Transmission/Reception Points (TRPs) to which the downlink shared channel is transmitted.

The control section 210 determines a TRP that becomes an application target of the downlink control information.

When the downlink control information is received from one of a plurality of these TRPs, the control section 210 may apply the downlink control information to all of a plurality of these TRPs (the first aspect and the first application example).

When the downlink control information is received from one of a plurality of these TRPs, the control section 210 may determine a single TRP that becomes the application target of the downlink control information among a plurality of these TRPs based on at least one of a higher layer parameter and the downlink control information (the first aspect and the second application example).

When the downlink control information is received from each of a plurality of these TRPs, the control section 210 may determine the TRP that becomes the application target of the downlink control information based on at least one of a control resource set associated with a given search space set in which the downlink control information is detected, the given search space set, a Code Division Multiplexing (CDM) group of antenna ports of a demodulation reference signal of the downlink shared channel, configuration information of a downlink control channel including configuration information of the control resource set, a sequence used for scrambling initialization of a demodulation reference signal of the downlink control channel, a value of a given field in the downlink control information, and configuration information related to the downlink control information (second aspect).

The downlink control information may be at least one of a format 2_0 including one or more slot format indicators, a format 2_1 including one or more pre-emption indications, a format 2_2 including one or more Transmission Power Control (TPC) commands of an uplink shared channel or an uplink control channel, and a format 2_3 including one or more Transmission Power Control (TPC) commands of a sounding reference signal.

(Hardware Configuration)

In addition, the block diagrams used to describe the above embodiment illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 16:
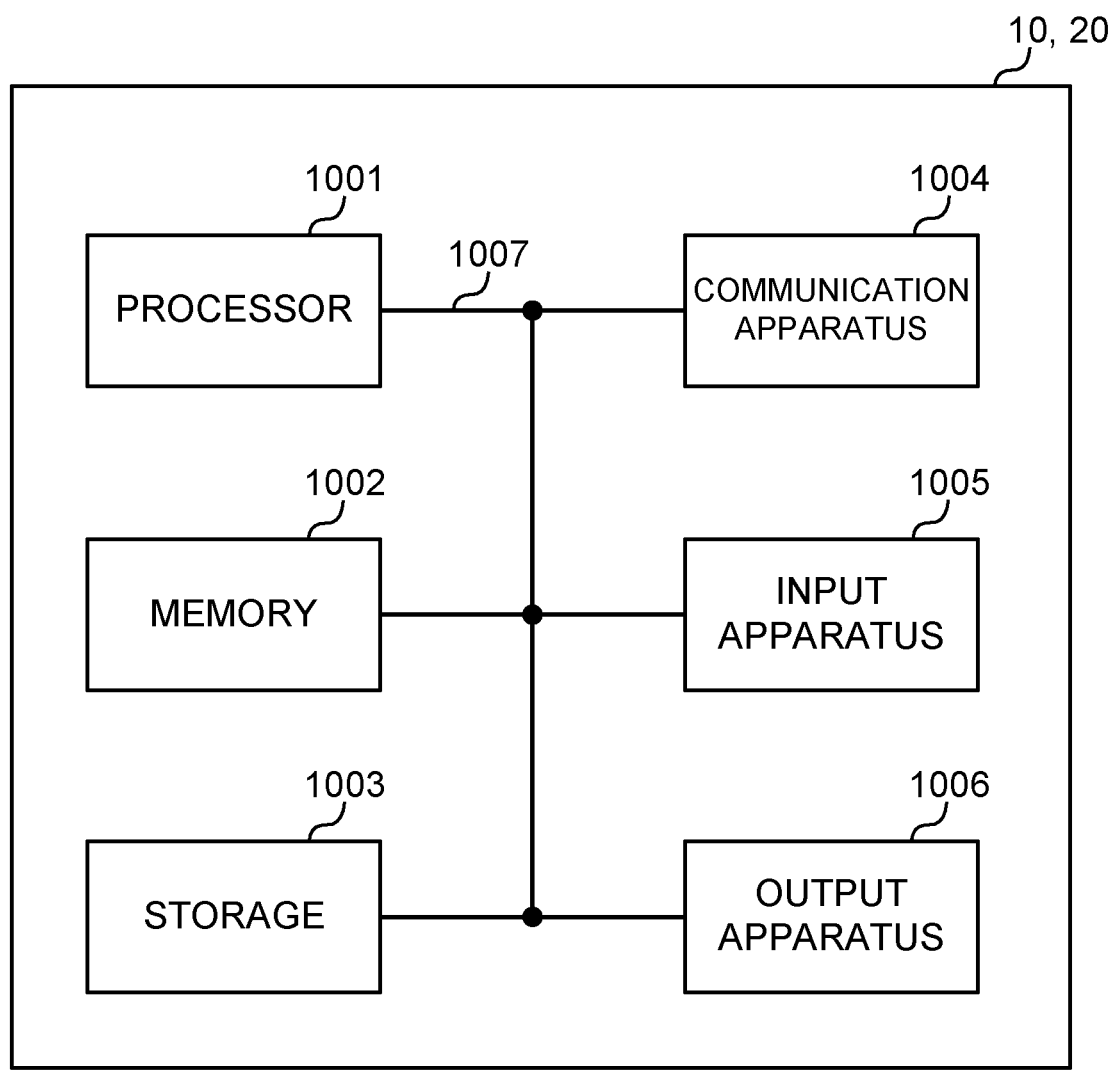
FIG. 16 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 16 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 16 or may be configured without including part of the apparatuses.

For example, FIG. 16 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiment are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmission/reception antennas 130 (230) may be realized by the communication apparatus 1004. The transmitting/receiving section 120 (220) may be physically or logically separately implemented as a transmitting section 120a (220a) and a receiving section 120b (220b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signalling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may be configured one or a plurality of durations (frames) in a time domain. Each of one or a plurality of durations (frames) that makes up a radio frame may be referred to as a subframe. Furthermore, the subframe may be configured one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may be configured one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may be configured one or a plurality of symbols in the time domain. Furthermore, the mini slot may be referred to as a subslot. The mini slot may be configured a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each be configured one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may be configured one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (such as the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspects/embodiment described in the present disclosure and may be performed by using other methods. For example, the information may be notified in the present disclosure by a physical layer signalling (e.g., Downlink Control Information (DCI) and Uplink Control Information (UCI)), a higher layer signalling (e.g., a Radio Resource Control (RRC) signalling, broadcast information (such as a Master Information Block (MIB) and a System Information Block (SIB)), and a Medium Access Control (MAC) signalling), other signals or combinations of these.

In addition, the physical layer signalling may be referred to as Layer 1/Layer 2 (L1/L2) control information (L1/L2 control signal) or L1 control information (L1 control signal). Furthermore, the RRC signalling may be referred to as an RRC message, and may be, for example, an RRCConnectionSetup message or an RRCConnectionReconfiguration message. Furthermore, the MAC signalling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "Base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmission apparatus, a reception apparatus or a radio communication apparatus. In addition, at least one of the base station and the mobile station may be, for example, a device mounted on a moving object or the moving object itself. The moving object may be a vehicle (e.g., a car or an airplane), may be a moving object (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/ embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flow-chart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), the Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends to not be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
   a receiver that receives information related to a first control resource set and information related to a second control resource set, both information being included in downlink control channel configuration information; and
   a processor that controls reception of a plurality of downlink shared channels scheduled by a downlink control channel for the first control resource set and a downlink control channel for the second control resource set,
   wherein when receiving downlink control information including a pre-emption indication in any of the downlink control channel for the first control resource set and the downlink control channel for the second control resource set, the processor applies the pre-emption indication to the plurality of downlink shared channels scheduled by the downlink control channel for the first control resource set and the downlink control channel for the second control resource set, even when receiving the pre-emption in only one of the downlink control channel for the first control resource set and the downlink control channel for the second control resource set.

2. The terminal according to claim 1, wherein the plurality of downlink shared channels correspond to two codewords.

3. The terminal according to claim 1, wherein the first control resource set and the second control resource set are associated with a same cell ID.

4. The terminal according to claim 2, wherein the first control resource set and the second control resource set are associated with a same cell ID.

5. A radio communication method for a terminal, comprising:
   receiving information related to a first control resource set and information related to a second control resource set, both information being included in downlink control channel configuration information; and
   controlling reception of a plurality of downlink shared channels scheduled by a downlink control channel for the first control resource set and a downlink control channel for the second control resource set,
   wherein when receiving downlink control information including a pre-emption indication in any of the downlink control channel for the first control resource set and the downlink control channel for the second control resource set, applying the pre-emption indication to the plurality of downlink shared channels scheduled by the downlink control channel for the first control resource set and the downlink control channel for the second control resource set, even when receiving the pre-emption in only one of the downlink control channel for the first control resource set and the downlink control channel for the second control resource set.

6. A system comprising a terminal and a base station, wherein
   the terminal comprises:
   a receiver that receives information related to a first control resource set and information related to a second control resource set, both information being included in downlink control channel configuration information; and
   a processor of the terminal that controls reception of a plurality of downlink shared channels scheduled by a downlink control channel for the first control resource set and a downlink control channel for the second control resource set,
   wherein when receiving downlink control information including a pre-emption indication in any of the downlink control channel for the first control resource set and the downlink control channel for the second control resource set, the processor of the terminal applies the pre-emption indication to the plurality of downlink shared channels scheduled by the downlink control channel for the first control resource set and the downlink control channel for the second control resource set, even when receiving the pre-emption in only one of the downlink control channel for the first control resource set and the downlink control channel for the second control resource set.

* * * * *